(12) United States Patent
Kitayama et al.

(10) Patent No.: US 10,035,888 B2
(45) Date of Patent: Jul. 31, 2018

(54) NON-BIREFRINGENT RESIN MATERIAL AND FILM

(71) Applicant: KANEKA CORPORATION, Osaka-shi, Osaka (JP)

(72) Inventors: Fuminobu Kitayama, Takasago (JP); Nobuyoshi Maizuru, Takasago (JP); Keisuke Hatano, Settsu (JP)

(73) Assignee: KANEKA CORPORATION, Osaka (JP)

(*) Notice: Subject to any disclaimer, the term of this patent is extended or adjusted under 35 U.S.C. 154(b) by 0 days.

(21) Appl. No.: 14/406,086

(22) PCT Filed: Jun. 26, 2013

(86) PCT No.: PCT/JP2013/003992
§ 371 (c)(1),
(2) Date: Dec. 5, 2014

(87) PCT Pub. No.: WO2014/002491
PCT Pub. Date: Jan. 3, 2014

(65) Prior Publication Data
US 2015/0147550 A1    May 28, 2015

(30) Foreign Application Priority Data

Jun. 26, 2012 (JP) .................. 2012-143417
Apr. 5, 2013 (JP) .................. 2013-079954

(51) Int. Cl.
| | |
|---|---|
| C08J 5/18 | (2006.01) |
| G02B 1/04 | (2006.01) |
| C08L 33/12 | (2006.01) |
| C08L 33/06 | (2006.01) |
| C08L 33/08 | (2006.01) |
| C08L 33/24 | (2006.01) |
| C08F 8/00 | (2006.01) |
| C08F 8/32 | (2006.01) |
| F21V 8/00 | (2006.01) |

(52) U.S. Cl.
CPC .................. C08J 5/18 (2013.01); C08F 8/00 (2013.01); C08F 8/32 (2013.01); C08L 33/06 (2013.01); C08L 33/08 (2013.01); C08L 33/12 (2013.01); C08L 33/24 (2013.01); G02B 1/04 (2013.01); G02B 1/041 (2013.01); G02B 1/045 (2013.01); C08F 2810/20 (2013.01); C08J 2333/12 (2013.01); C08J 2351/00 (2013.01); C08J 2433/12 (2013.01); C08J 2451/00 (2013.01); G02B 6/003 (2013.01); G02B 6/0011 (2013.01); Y10T 428/25 (2015.01); Y10T 428/254 (2015.01)

(58) Field of Classification Search
CPC .......... C08L 33/24; C08L 33/08; C08L 33/06; C08L 33/12; C08L 33/064; C08L 101/00; C08L 51/06; G02B 1/04; G02B 5/3083; C08F 220/10; C08F 8/32; Y10T 428/254; Y10T 428/25
See application file for complete search history.

(56) References Cited

U.S. PATENT DOCUMENTS

| | | | |
|---|---|---|---|
| 4,373,065 A | 2/1983 | Prest | |
| 4,902,742 A | 2/1990 | Yamamoto et al. | |
| 5,270,397 A * | 12/1993 | Rhein | C08F 285/00 525/281 |
| 6,348,542 B1 * | 2/2002 | Naruse | C08F 285/00 524/504 |
| 6,586,515 B1 | 7/2003 | Koike | |
| 8,822,614 B2 | 9/2014 | Yonemura et al. | |
| 2007/0243364 A1 * | 10/2007 | Maekawa | C08L 33/064 428/220 |
| 2009/0306321 A1 | 12/2009 | Koike | |

FOREIGN PATENT DOCUMENTS

| | | |
|---|---|---|
| EP | 2 690 139 | 1/2014 |
| JP | 63-122748 | 5/1988 |
| JP | 64-75553 | 3/1989 |
| JP | 04076013 A * | 3/1992 |
| JP | 6-11615 | 1/1994 |
| JP | 6-256537 | 9/1994 |
| JP | 11-293116 | 10/1999 |
| JP | 3648201 B | 5/2005 |
| JP | 3696649 B | 9/2005 |
| JP | 2006-308682 | 11/2006 |
| JP | 2006-337493 | 12/2006 |
| JP | 2006337493 A * | 12/2006 |

(Continued)

OTHER PUBLICATIONS

Machine Translation of JP3696649. Retrieved Jun. 25, 2016.*
Machine Translation of JP3648201. Retrieved Jun. 25, 2016.*
Machine Translation of JP2006-337493. Retrieved Jun. 23, 2016.*
"Allyl Methacrylate Technical Information". BASF Group, (2011); pp. 1-3.*
Machine Translation of JP H04-076013. Retrieved Dec. 19, 2017.*
Koike, et al., "Advanced Polymeric Material One Point 1, Photonics Polymer", Jun. 10, 2004, pp. 31-55, 1st edition, Kyoritsu Shuppan Co., Ltd., Japan.
Extended European Search Report issued in counterpart European Application No. 13809071.7, dated Nov. 24, 2015, 7 pages.

(Continued)

*Primary Examiner* — Prashant J Khatri

(74) *Attorney, Agent, or Firm* — Hamre, Schumann, Mueller & Larson, P.C.

(57) ABSTRACT

Disclosed herein is a non-birefringent resin material that is very small in both orientation birefringence and photoelastic birefringence, has high transparency, and is capable of providing a molded article having few foreign matter defects and a film made of such a material. The non-birefringent resin material contains a resin (A) and a polymer (B) and has an orientation birefringence of $-1.7 \times 10^{-4}$ to $1.7 \times 10^{-4}$ and a photoelastic constant of $-4 \times 10^{-12}$ to $4 \times 10^{-12}$ Pa$^{-1}$.

28 Claims, 2 Drawing Sheets

(56) References Cited

FOREIGN PATENT DOCUMENTS

| | | |
|---|---|---|
| JP | 2009-203348 | 9/2009 |
| JP | 2009-204860 | 9/2009 |
| JP | 2009-293021 | 12/2009 |
| JP | 2010-070646 | 4/2010 |
| JP | 2010-96919 | 4/2010 |
| JP | 2010-270162 | 12/2010 |
| JP | 4624845 B | 2/2011 |
| JP | 5142938 B | 2/2013 |
| TW | 200535160 | 11/2005 |
| TW | 201202277 | 1/2012 |
| WO | 2005/105918 | 11/2005 |
| WO | WO 2010/119730 | 10/2010 |
| WO | 2011/142325 | 11/2011 |
| WO | WO 2012/114718 | 8/2012 |

OTHER PUBLICATIONS

Taiwanese Office Action dated Jan. 22, 2015; Taiwanese Application No. 102122784, together with English translation of Search Report (15 pages).

\* cited by examiner

[Fig. 1]
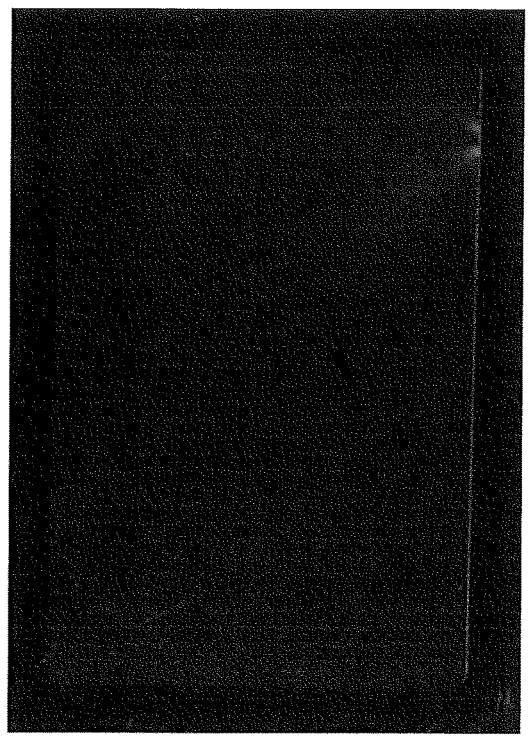
[Fig. 2]
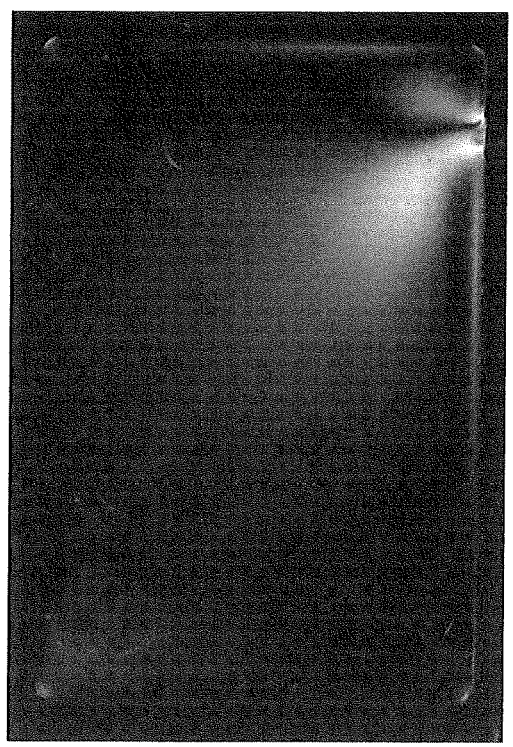

[Fig. 3]
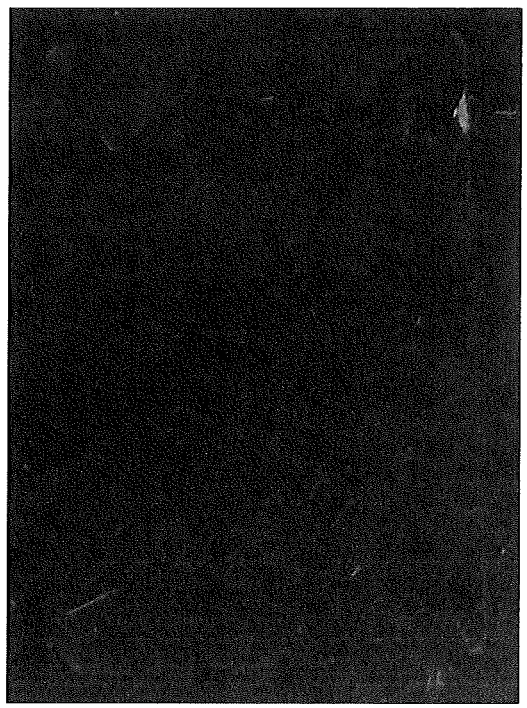

NON-BIREFRINGENT RESIN MATERIAL AND FILM

TECHNICAL FIELD

The present invention relates to a non-birefringent resin material and a film.

BACKGROUND ART

Light-permeable resins are widely used as materials for forming film-, plate-, and lens-like optical members for use in various optical devices (e.g., films, substrates, and prism sheets for use in liquid crystal display devices; lenses in lens systems for signal reading of optical disk devices; Fresnel lenses and lenticular lenses for projection screens). Such resins are generally called "optical resins" or "optical polymers".

Birefringence is one of important optical characteristics that should be taken into consideration when optical resins are used to form optical members. That is, in most cases, it is undesirable that optical resins have high birefringence. Particularly, in the above-mentioned applications (liquid crystal display devices, optical disk devices, projection screens, etc.), the presence of a birefringent film or lens in an optical path adversely affects image quality or signal reading performance, and therefore the use of an optical member made of an optical resin whose birefringence is as low as possible is desired. Needless to say, camera lenses, eyeglass lenses, and the like also preferably have low birefringence.

Meanwhile, as is well known in the art, birefringence of an optical polymer includes "orientation birefringence" mainly caused by the orientation of main chains of the polymer and "photoelastic birefringence" caused by stress. Orientation birefringence and photoelastic birefringence have their respective signs that depend on the chemical structure of a polymer, and are properties intrinsic to individual polymers.

That is, orientation birefringence generally develops when main chains of a chain-like polymer (polymer chains) are oriented, and this orientation of main chains occurs in a process involving the flowing of a material, such as an extrusion-molding or stretching process during production of a polymer film or an injection molding process frequently used for production of optical members with various shapes, and is fixed and remains in an optical member. Hereinafter, the phrase "orientation birefringence is positive" means that a refractive index is large in a direction parallel to the orientation direction of polymer chains, and the phrase "orientation birefringence is negative" means that a refractive index is large in a direction orthogonal to the orientation direction of polymer chains.

On the other hand, photoelastic birefringence is caused by elastic deformation (distortion) of a polymer. In the case of an optical member using a polymer, elastic deformation (distortion) occurs and remains in its material due to, for example, volume contraction caused by cooling from a temperature around the glass transition temperature of the polymer to a temperature lower than that, which becomes the cause of photoelastic birefringence. Further, the material is elastically deformed also by, for example, external force exerted on the optical member fixed to a device used at ordinary temperature (glass transition temperature or lower), which causes photoelastic birefringence. As shown by the following formula, a photoelastic constant is defined as a coefficient $\gamma$ of $\Delta\sigma$ when a birefringence difference $\Delta n$ is caused by a stress difference $\Delta\sigma$.

$$\Delta n = \gamma \Delta \sigma$$

Hereinafter, the phrase "photoelastic birefringence is positive" means that a refractive index is large in a direction parallel to a direction in which tensile stress is applied (direction in which polymer chains are oriented), and the phrase "photoelastic birefringence is negative" means that a refractive index is large in a direction orthogonal to a direction in which tensile stress is applied.

There are various reports about suppression of the above-described birefringence.

For example, Patent Document 1 discloses a non-birefringent optical resin material obtained by blending two polymer resins that are opposite in the sign of orientation birefringence to each other and are completely miscible. However, it is difficult to uniformly mix the two polymer resins described in Patent Document 1 to obtain a practical polymer resin that uniformly exhibits low orientation birefringence as a whole, and aggregates of the polymer resins may cause foreign matter defects. Further, the polymer resins blended are different in their intrinsic refractive index, and therefore light scattering occurs due to non-uniformity of refractive index, which makes it impossible to obtain an optical material excellent in transparency. Although there is no description about photoelastic birefringence, it is conceivable that a polymer composition of Example will have significantly high photoelastic birefringence. Further, the mechanical strength, especially impact resistance, of the optical resin material is not always sufficient, which causes a problem such as cracking when the optical resin material is practically used.

Patent Document 2 discloses a method for obtaining a non-birefringent optical resin material by adding, to a matrix composed of a transparent polymer resin, a low-molecular material whose orientation birefringence tends to cancel out the orientation birefringence of the polymer resin material. The low-molecular material has a molecular weight of 5000 or less, and a resulting molded body has excellent transparency. However, there is no description about improvement in photoelastic birefringence or mechanical strength. Further, there is a case where heat resistance is reduced.

Patent document 3 discloses a method for obtaining an optical resin material having low orientation birefringence by adding, to a transparent polymer resin, a birefringent fine inorganic substance that is oriented in the same direction as the linked chains of the polymer resin as the polymer resin is oriented by the application of external force. Orientation birefringence can be suppressed also by this method, but there is no description about improvement in photoelastic birefringence or mechanical strength.

Patent document 4 discloses a method for obtaining a non-birefringent optical resin material having low orientation birefringence and low photoelastic birefringence, in which an optical material having a multicomponent system of three or more components including a binary or higher copolymerization system is obtained by selecting the combination and constituent ratio (compositional ratio) of components of the multicomponent system so that both the orientation birefringence and photoelastic birefringence of the optical material are cancelled out at the same time. This method makes it possible to extremely reduce both orientation birefringence and photoelastic birefringence at the same time, which could not heretofore be achieved. However, the composition of the optical resin material is limited to some extent to make it possible to cancel out both orientation birefringence and photoelastic birefringence at the same time, and therefore the glass transition temperature of the optical resin material is as low as less than 100° C. and there is a problem such as a reduction in mechanical strength. Further, there may be a problem that polymer decomposition occurs during molding performed under such conditions that the optical resin material is retained at high temperature, such as melt-extrusion molding for forming film.

Patent Document 5 discloses a method for obtaining a resin composition, which has high heat resistance and exhibits excellent mechanical strength, especially bending resistance, when formed into a film, and an optical film. The resin composition is obtained by using, in combination, an acrylic resin having a glass transition temperature of 120° C. or higher and a graft copolymer obtained by graft copolymerization of an acrylic rubber-like polymer and a vinyl-based polymerizable monomer ("core-shell"-type impact resistance improver, hereinafter also referred to as "core-shell polymer"). However, the data of orientation birefringence and photoelastic birefringence is not shown in Examples, and therefore it is unclear whether the graft copolymer is effective at improving birefringence. Particularly, there is no description about improvement in photoelastic birefringence in the specification. Patent Document 5 states that the graft copolymer is added to improve mechanical strength. However, there is no description about the influence of the graft copolymer on birefringence and there is no description about the orientation birefringence and photoelastic birefringence in Examples, from which it is apparent that Patent Document 5 has no technical idea that the graft copolymer is used to adjust birefringence.

Patent Document 6 discloses an optical film obtained by molding a resin composition containing an acrylic resin (A) and an acrylic rubber (B). The acrylic resin (A) is a heat-resistant acrylic resin (A-1) containing a repeating unit derived from a methacrylate monomer, a repeating unit derived from a vinyl aromatic monomer, a repeating unit derived from a methacrylate monomer having an aromatic group, and a cyclic acid anhydride repeating unit. This document states that the optical film has high heat resistance and excellent trimming property and has excellent optical characteristics even when stretched. Although there is a description about improvement in trimming property, there is no description about the mechanical strength of the film other than trimming property, such as resistance to cracking on bending, and therefore it is unclear from this document whether the mechanical strength of the optical film is at such a level that the optical film can be practically used without problem. Further, optical films of Examples stretched 100% (twice) have high birefringence (orientation birefringence), and none of the optical films of Examples is low in both orientation birefringence and photoelastic constant (photoelastic birefringence), and therefore improvement in birefringence is not sufficiently achieved. Further, as shown in Examples, the acrylic rubber (B) described in this document is a so-called graft copolymer (core-shell polymer), and this document states that the acrylic rubber (B) is added to improve mechanical strength while maintaining transparency such as haze, but the influence of the acrylic rubber (B) on birefringence is not taken into consideration at all. For example, when a comparison is made between Examples and Comparative Examples, the orientation birefringences of the optical films of Examples to which the acrylic rubber (B) is added are adversely higher than those of optical films of Comparative Examples using only the acrylic resin (A), and the photoelastic constants (photoelastic birefringences) of the optical films of Examples are equal to those of the optical films of Comparative Examples using only the acrylic resin (A). Further, the heat-resistant acrylic resin has a negative photoelastic constant, and the acrylic rubber (B) is also estimated to have a negative photoelastic constant from the composition thereof, from which it is apparent that the acrylic rubber (B) deteriorates orientation birefringence and photoelastic birefringence, that is, this document has no technical idea that the acrylic rubber (B) is used to adjust orientation birefringence and photoelastic birefringence.

Patent Document 1: U.S. Pat. No. 4,373,065
Patent Document 2: Japanese Patent No. 3696649
Patent Document 3: Japanese Patent NO. 3648201
Patent Document 4: Japanese Patent No. 4624845
Patent Document 5: JP-A-2009-203348
Patent Document 6: Japanese Patent No. 5142938

DISCLOSURE OF THE INVENTION

Problems to be Solved by the Invention

It is an object of the present invention to provide a non-birefringent resin material that is very low in both orientation birefringence and photoelastic birefringence, has high transparency, and is capable of providing a molded article having few foreign matter defects and a film made of such a material. It is also an object of the present invention to provide an acrylic resin composition that is very low in both orientation birefringence and photoelastic birefringence, has high transparency, and is capable of providing a molded article having few foreign matter defects and a film made of such a composition. Further, it is also an object of the present invention to provide a non-birefringent resin material that is very low in both orientation birefringence and photoelastic birefringence and has high transparency, few foreign matter defects, and excellent mechanical strength and a film made of such a material.

Means for Solving the Problems

The present inventors have found that the above objects can be achieved by using, as two essential polymer components, a resin (A) as a matrix component and a polymer (B) so that both an orientation birefringence value and a photoelastic constant become low. This finding has led to the completion of a non-birefringent resin material or a resin composition and a film thereof.

More specifically, the present invention includes the following.

(1) A non-birefringent resin material comprising a resin (A) and a polymer (B) and having an orientation birefringence of $-1.7 \times 10^{-4}$ to $1.7 \times 10^{-4}$ and a photoelastic constant of $-4 \times 10^{-12}$ to $4 \times 10^{-12}$ $Pa^{-1}$.

(2) A non-birefringent resin material comprising a resin (A) and a polymer (B), wherein a photoelastic constant of the resin (A) and a photoelastic constant of the polymer (B) are opposite in sign, and the photoelastic constant of the resin (A) is cancelled out by the photoelastic constant of the polymer (B).

(3) The non-birefringent resin material according to the above (1) or (2), which has a tensile elongation at breakage of 10% or more.

(4) The non-birefringent resin material according to any one of the above (1) to (3), wherein the resin (A) is an acrylic resin.

(5) The non-birefringent resin material according to any one of the above (1), (3), and (4), wherein a photoelastic constant of the resin (A) and a photoelastic constant of the polymer (B) are opposite in sign.

(6) The non-birefringent resin material according to any one of the above (1) to (5), wherein the polymer (B) has a cross-linked structure.

(7) The non-birefringent resin material according to any one of the above (1) to (6), wherein the polymer (B) has a hard polymer part.

(8) The non-birefringent resin material according to any one of the above (1) to (7), wherein the polymer (B) has a non-crosslinked structure.

(9) The non-birefringent resin material according to any one of the above (1) to (8), wherein the polymer (B) is a multi-layered polymer.

(10) The non-birefringent resin material according to the above (9), wherein the polymer (B) is a multi-layered polymer containing a cross-linked polymer layer and a hard polymer layer.

(11) The non-birefringent resin material according to the above (10), wherein the polymer (B) is a multi-layered polymer having a (meth)acrylic cross-linked polymer layer and a hard polymer layer.

(12) The non-birefringent resin material according to the above (10) or (11), wherein the hard polymer layer contains a non-crosslinked hard polymer layer.

(13) The non-birefringent resin material according to any one of the above (10) to (12), wherein the polymer (B) has a (meth)acrylic cross-linked polymer layer and a hard polymer layer containing, as a structural unit, a vinyl-based monomer having an alicyclic structure, a heterocyclic structure, or an aromatic group.

(14) The non-birefringent resin material according to the above (13), wherein the vinyl-based monomer having an alicyclic structure, a heterocyclic structure, or an aromatic group is a monomer represented by the following formula (4):

[Chemical Formula 1]

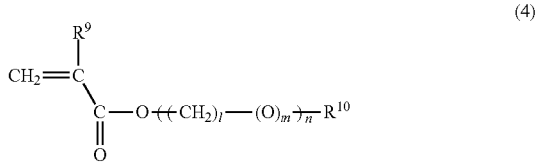

(4)

wherein $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10.

(15) The non-birefringent resin material according to the above (14), wherein the hard polymer layer having, as a structural unit, the monomer represented by the above formula (4) is obtained by polymerization of 1 to 100 wt % of the monomer represented by the above formula (4), 99 to 0 wt % of another monomer copolymerizable therewith, and 0 to 2.0 parts by weight of a polyfunctional monomer (per 100 parts by weight of a total amount of the monomer represented by the above formula (4) and the another monomer copolymerizable therewith).

(16) The non-birefringent resin material according to any one of the above (11) to (15), wherein the (meth)acrylic cross-linked polymer layer is obtained by polymerization of 50 to 100 wt % of alkyl acrylate, 50 to 0 wt % of another monomer copolymerizable therewith, and 0.05 to 10 parts by weight of a polyfunctional monomer (per 100 parts by weight of a total amount of the alkyl acrylate and the another monomer copolymerizable therewith).

(17) The non-birefringent resin material according to any one of the above (14) to (16), wherein in the polymer (B), the hard polymer layer constitutes an outermost layer, and the outermost layer is a hard polymer layer having, as a structural unit, the monomer represented by the above formula (4).

(18) The non-birefringent resin material according to the above (17), wherein in the polymer (B), a soft layer having the (meth)acrylic cross-linked polymer layer is adjacent to an inner side of the outermost layer.

(19) The non-birefringent resin material according to any one of the above (14) to (16), wherein the polymer (B) has a soft inner layer and a hard outer layer, the inner layer has the (meth)acrylic cross-linked polymer layer, and the outer layer has a hard polymer layer having, as a structural unit, the monomer represented by the above formula (4).

(20) The non-birefringent resin material according to any one of the above (14) to (16), wherein the polymer (B) has a hard inner layer, a soft intermediate layer, and a hard outer layer, the inner layer is composed of at least one hard polymer layer, the intermediate layer has a soft polymer layer composed of the (meth)acrylic cross-linked polymer layer, and the outer layer has a hard polymer layer having, as a structural unit, the monomer represented by the above formula (4).

(21) The non-birefringent resin material according to the above (20), wherein the polymer (B) further has a soft innermost layer.

(22) The non-birefringent resin material according to any one of the above (14) to (21), wherein the monomer represented by the above formula (4) is at least one selected from the group consisting of benzyl (meth)acrylate, dicyclopentanyl (meth)acrylate, and phenoxyethyl (meth)acrylate.

(23) The non-birefringent resin material according to any one of the above (11) to (22), wherein the polymer (B) has a volume-average particle diameter to the (meth)acrylic cross-linked polymer layer of 20 to 450 nm.

(24) The non-birefringent resin material according to any one of the above (11) to (23), wherein an amount of the (meth)acrylic cross-linked polymer layer contained in the polymer (B) is 1 to 60 parts by weight per 100 parts by weight of the non-birefringent resin material.

(25) The non-birefringent resin material according to any one of the above (1) to (24), further comprising birefringent inorganic microparticles.

(26) The non-birefringent resin material according to any one of the above (1) to (25), further comprising a birefringent low-molecular compound.

(27) The non-birefringent resin material according to any one of the above (1) to (26), wherein the resin (A) is at least one selected from the group consisting of a glutarimide acrylic resin (D) having a unit represented by the following general formula (1) and a unit represented by the following general formula (2), a lactone ring-containing acrylic polymer, a partially-hydrogenated styrene-based polymer obtained by partial hydrogenation of aromatic rings of a styrene-based polymer obtained by polymerization of a styrene monomer and another monomer copolymerizable therewith, an acrylic polymer containing a cyclic acid anhydride repeating unit, and a hydroxyl group- and/or carboxyl group-containing acrylic polymer:

[Chemical Formula 2]

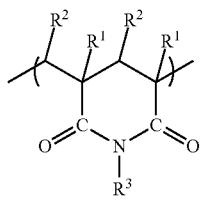
(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms; and

[Chemical Formula 3]

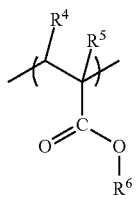
(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms.

(28) The non-birefringent resin material according to the above (27), wherein the glutarimide acrylic resin (D) does not contain a unit represented by the following general formula (3):

[Chemical Formula 4]

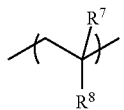
(3)

wherein $R^7$ is hydrogen or an alkyl group having 1 to 8 carbon atoms and $R^8$ is an aryl group having 6 to 10 carbon atoms.

(29) The non-birefringent resin material according to any one of the above (2) to (28), which has a photoelastic constant of $-4 \times 10^{-12}$ to $4 \times 10^{-12}$ $Pa^{-1}$.

(30) The non-birefringent resin material according to any one of the above (2) to (29), which has an orientation birefringent of $-1.7 \times 10^{-4}$ to $1.7 \times 10^{-4}$.

(31) A film made of the non-birefringent resin material according to any one of the above (1) to (30).

(32) The film according to the above (31), which is obtained by melt extrusion.

(33) The film according to the above (31) or (32), which has an orientation birefringence of $-1.7 \times 10^{-4}$ to $1.7 \times 10^{-4}$ and a photoelastic constant of $-4 \times 10^{-12}$ to $4 \times 10^{-12}$ $Pa^{-1}$.

(34) The film according to any one of the above (31) to (33), which has a tensile elongation at breakage of 10, or more.

(35) The film according to any one of the above (31) to (34), which has a thickness of 10 to 500 μm.

(36) An acrylic resin composition comprising an acrylic resin (A) and a polymer (B) having a (meth)acrylic cross-linked polymer layer and a hard polymer layer having, as a structural unit, a monomer represented by the following formula (4):

[Chemical Formula 5]

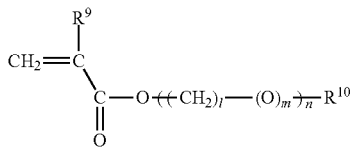
(4)

wherein $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10.

(37) The acrylic resin composition according to the above (36), wherein the hard polymer layer having, as a structural unit, the monomer represented by the above formula (4) is obtained by polymerization of a monomer mixture containing 1 to 100 wt % of the monomer represented by the above formula (4), 99 to 0 wt % of another monomer copolymerizable therewith, and 0 to 2.0 parts by weight of a polyfunctional monomer (per 100 parts by weight of a total amount of the monomer represented by the above formula (4) and the another monomer copolymerizable therewith).

(38) The acrylic resin composition according to the above (36) or (37), wherein the (meth)acrylic cross-linked polymer layer is obtained by polymerization of a monomer mixture containing 50 to 100 wt % of alkyl acrylate, 50 to 0 wt % of another monomer copolymerizable therewith, and 0.05 to 10 parts by weight of a polyfunctional monomer (per 100 parts by weight of a total amount of the alkyl acrylate and the another monomer copolymerizable therewith).

(39) The acrylic resin composition according to the above (36), wherein the polymer (B) is obtained by (B-1) polymerization of a monomer mixture containing 50 to 100 wt % of alkyl acrylate, 50 to 0 wt % of another monomer copolymerizable therewith, and 0.05 to 10 parts by weight of a polyfunctional monomer (per 100 parts by weight of a total amount of the alkyl acrylate and the another monomer copolymerizable therewith) to obtain a (meth)acrylic cross-linked polymer layer and then by (B-2) polymerization of a monomer mixture containing 1 to 100 wt % of the monomer represented by the above formula (4), 99 to 0 wt % of another monomer copolymerizable therewith, and 0 to 2.0 parts by weight of a polyfunctional monomer (per 100 parts by weight of a total amount of the monomer represented by the above formula (4) and the another monomer copolymerizable therewith) in the presence of the (meth)acrylic cross-linked polymer layer to form a hard polymer layer having, as a structural unit, the monomer represented by the above formula (4).

(40) The acrylic resin composition according to any one of the above (36) to (39), wherein the polymer (B) has a volume-average particle diameter to the (meth)acrylic cross-linked polymer layer of 20 to 450 nm.

(41) The acrylic resin composition according to any one of the above (36) to (40), wherein an amount of the (meth)acrylic cross-linked polymer layer contained in the polymer (B) is 1 to 60 parts by weight per 100 parts by weight of the acrylic resin composition.

(42) An acrylic resin composition comprising: an acrylic resin (A); and a polymer (B) that is a (meth)acrylic rubber-containing graft copolymer obtained by multistage polymerization and that is formed by polymerization of a mixture containing a monomer represented by the following formula (4) and another monomer copolymerizable therewith in the presence of (meth)acrylic rubber-containing polymer particles in at least one stage of the multistage polymerization:

[Chemical Formula 6]

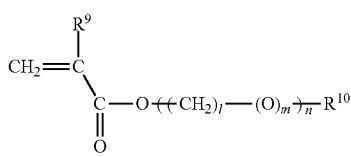

(4)

wherein $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10.

(43) The acrylic resin composition according to the above (42), wherein the mixture of the monomer represented by the above formula (4) and another monomer copolymerizable therewith contains 1 to 100 wt % of the monomer represented by the above formula (4), 99 to 0 wt % of another monomer copolymerizable therewith, and 0 to 2.0 parts by weight of a polyfunctional monomer (per 100 parts by weight of a total amount of the monomer represented by the above formula (4) and the another monomer copolymerizable therewith).

(44) The acrylic resin composition according to the above (42) or (43), wherein the (meth)acrylic rubber-containing polymer particles have a rubber part obtained by polymerization of 50 to 100 wt % of alkyl acrylate, 50 to 0 wt % of another monomer copolymerizable therewith, and 0.05 to 10 parts by weight of a polyfunctional monomer (per 100 parts by weight of a total amount of the alkyl acrylate and the another monomer copolymerizable therewith).

(45) The acrylic resin composition according to the above (42), wherein the polymer (B) is obtained by (B-1) polymerization of a monomer mixture containing 50 to 100 wt % of alkyl acrylate, 50 to 0 wt % of another monomer copolymerizable therewith, and 0.05 to 10 parts by weight of a polyfunctional monomer (per 100 parts by weight of a total amount of the alkyl acrylate and the another monomer copolymerizable therewith) to obtain (meth)acrylic rubber-containing polymer particles and then by (B-2) polymerization of a monomer mixture containing 1 to 100 wt % of the monomer represented by the above formula (4), 99 to 0 wt % of another monomer copolymerizable therewith, and 0 to 2.0 parts by weight of a polyfunctional monomer (per 100 parts by weight of a total amount of the monomer represented by the above formula (4) and the another monomer copolymerizable therewith) in the presence of the (meth)acrylic rubber-containing polymer particles.

(46) The acrylic resin composition according to any one of the above (42) to (45), wherein the polymer (B) has a volume-average particle diameter to the (meth)acrylic rubber-containing polymer particle of 20 to 450 nm.

(47) The acrylic resin composition according to any one of the above (42) to (46), wherein an amount of the (meth)acrylic rubber-containing polymer particles contained in the polymer (B) is 1 to 60 parts by weight per 100 parts by weight of the acrylic resin composition.

(48) The acrylic resin composition according to any one of the above (36) to (47), wherein the monomer represented by the above formula (4) is at least one selected from the group consisting of benzyl (meth)acrylate, dicyclopentanyl (meth)acrylate, and phenoxyethyl (meth)acrylate.

(49) The acrylic resin composition according to any one of the above (36) to (48), wherein the acrylic resin (A) has a glass transition temperature of 100° C. or higher.

(50) The acrylic resin composition according to any one of the above (36) to (49), wherein the acrylic resin (A) is at least one selected from the group consisting of a glutarimide acrylic resin (D) having a unit represented by the following general formula (1) and a unit represented by the following general formula (2), a lactone ring-containing acrylic polymer, a partially-hydrogenated styrene-based polymer obtained by partial hydrogenation of aromatic rings of a styrene-based polymer obtained by polymerization of a styrene monomer and another monomer copolymerizable therewith, an acrylic polymer containing a cyclic acid anhydride repeating unit, and a hydroxyl group- and/or carboxyl group-containing acrylic polymer:

[Chemical Formula 7]

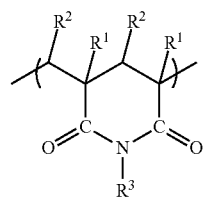

(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms; and

[Chemical Formula 8]

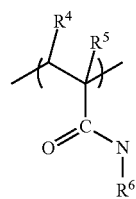

(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms.

(51) The acrylic resin composition according to the above (50), wherein the glutarimide acrylic resin (D) does not contain a unit represented by the following general formula (3):

[Chemical Formula 9]

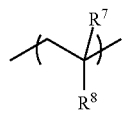

(3)

wherein $R^7$ is hydrogen or an alkyl group having 1 to 8 carbon atoms and $R^8$ is an aryl group having 6 to 10 carbon atoms.

(52) A film made of the acrylic resin composition according to any one of the above (36) to (51).

(53) The film according to the above (52), which is obtained by melt extrusion.

(54) The film according to the above (52) or (53), which has an orientation birefringence of $-1.7 \times 10^{-4}$ to $1.7 \times 10^{-4}$ and a photoelastic constant of $-4 \times 10^{-12}$ to $4 \times 10^{-12}$ $Pa^{-1}$.

(55) The film according to any one of the above (52) to (54), which has a thickness of 10 to 500 μm.

(56) A resin film having an orientation birefringence of $-1.7 \times 10^{-4}$ to $1.7 \times 10^{-4}$, a photoelastic constant of $-4 \times 10^{-12}$ to $4 \times 10^{-12}$ $Pa^{-1}$, a tensile elongation at breakage of 10% or more, and a thickness of 10 μm or more but 500 μm or less.

(57) The resin film according to the above (56), which has a glass transition temperature of 100° C. or higher.

(58) The resin film according to the above (56) or (57), which is an acrylic resin film.

(59) The resin film according to any one of the above (56) to (58), which is an unstretched film.

(60) An optical film comprising the resin film according to any one of the above (56) to (59).

(61) A laminated article comprising a base material and the resin film according to any one of the above (56) to (59) laminated on the base material.

Effects of the Invention

The non-birefringent resin material according to the present invention makes it possible to provide a molded article, especially an optical film, that is very low in both orientation birefringence and photoelastic birefringence and has high transparency and few foreign matter defects. The acrylic resin composition according to the present invention makes it possible to obtain a molded article that is very low in both orientation birefringence and photoelastic birefringence and has high transparency and few foreign matter defects, and is particularly suitable for use in forming a film. Further, according to the present invention, it is possible to provide a non-birefringent molded article, especially a non-birefringent optical film, that is very low in both orientation birefringence and photoelastic birefringence and has high transparency, few foreign matter defects, and excellent mechanical strength.

For example, a molded article, especially an optical film, obtained by molding the non-birefringent resin material according to the present invention has excellent optical isotropy even when stretched, and is therefore suitable for use as an optical member, such as an optical film or lens, of a liquid crystal display or the like. Further, the optical film according to the present invention has excellent mechanical strength, and therefore its film transportability and crack resistance during practical use are excellent and the occurrence of micro-cracking in a film trimming process during production can be reduced. Further, since the optical film according to the present invention has high mechanical strength, it is not necessary to perform a stretching process to improve film strength, which makes it possible to produce a thick film having a film thickness of, for example, 80 μm or more that is difficult for a stretched film to have.

Further, the optical film according to the present invention can achieve high heat resistance, which makes it possible to increase a curing temperature and a drying rate in a film coating process and therefore to improve productivity.

BRIEF DESCRIPTION OF THE DRAWINGS

FIG. 1 is a photograph showing the result of a crossed Nicols test in Example 3.

FIG. 2 is a photograph showing the result of a crossed Nicols test in Comparative Example 4.

FIG. 3 is a photograph showing the result of a crossed Nicols test in Comparative Example 5.

PREFERRED MODE FOR CARRYING OUT THE INVENTION

Hereinbelow, embodiments of the present invention will be described in detail, but the present invention is not limited to these embodiments.

A non-birefringent resin material according to the present invention and a film thereof contain, as essential components, a resin (A) as a matrix component and a polymer (B) whose photoelastic constant and orientation birefringence are preferably opposite in sign to those of the resin (A).

(Resin (A))

In the present invention, a resin generally having transparency can be used as the resin (A). Specific examples of the resin (A) include a wide variety of transparent thermoplastic resins such as polycarbonate resins typified by bisphenol A polycarbonate; aromatic vinyl-based resins and hydrogenated products thereof such as polystyrene, styrene-acrylonitrile copolymers, styrene-maleic anhydride resins, styrene-maleimide resins, styrene-(meth)acrylic acid resins, and styrene-based thermoplastic elastomers; polyolefin-based resins such as amorphous polyolefins, transparent polyolefins with a microcrystalline phase, and ethylene-methyl methacrylate resins; acrylic resins such as polymethylmethacrylate and styrene-methyl methacrylate resins and heat-resistant acrylic resins obtained by modifying the acrylic resins by, for example, imide cyclization, lactone cyclization, or denaturation with methacrylic acid; amorphous polyester resins or transparent polyester resins with a microcrystalline phase such as polyethylene terephthalate or polyethylene terephthalate partially denatured with a cyclohexanedimethylene group or isophthalic acid, polyethylene naphthalate, and polyarylate; polyimide resins; polyethersulfone resins; polyamide resins; cellulose-based resins such as triacetylcellulose resins; and polyphenylene oxide resins. In consideration of practical use, the resin is preferably selected so that a resulting molded body has a total light transmittance of 85% or higher, preferably 90% or higher, more preferably 92% or higher.

Among these resins, acrylic resins are particularly preferred for their excellent optical characteristics, heat resistance, and molding processability. Any acrylic resin may be used as long as it is a resin obtained by polymerization of a vinyl-based monomer containing alkyl (meth)acrylate, but an acrylic resin obtained by polymerization of 30 to 100 wt % of methyl methacrylate and 70 to 0 wt % of a monomer copolymerizable therewith is preferred.

A preferred example of another vinyl-based monomer copolymerizable with methyl methacrylate is (meth)acrylate (except for methyl methacrylate) whose alkyl residue has 1 to 10 carbon atoms. Specific examples of such another vinyl-based monomer copolymerizable with methyl methacrylate include: methacrylates such as ethyl methacrylate, butyl methacrylate, cyclohexyl methacrylate, benzyl methacrylate, glycidyl methacrylate, epoxycyclohexylmethyl methacrylate, 2-hydroxyethyl methacrylate, 2-hydroxypropyl methacrylate, dicyclopentanyl methacrylate, 2,2,2-trifluoroethyl methacrylate, 2,2,2-trichloroethyl methacrylate, and isobornyl methacrylate; acrylates such as methyl acrylate, ethyl acrylate, butyl acrylate, 2-ethylhexyl acrylate, glycidyl acrylate, epoxycyclohexylmethyl acrylate, 2-hydroxyethyl acrylate, 2-hydroxypropyl acrylate; carboxylic acids such as methacrylic acid and acrylic acid and esters thereof; vinyl cyanides such as acrylonitrile and methacrylonitrile; vinyl arenes such as styrene, α-methyl styrene, monochlorostyrene, and dichlorostyrene; maleic acid and fumaric acid and esters thereof; vinyl halides such as vinyl chloride, vinyl bromide, and chloroprene; vinyl acetate; alkenes such as ethylene, propylene, butylene, butadiene, and isobutylene; halogenated alkenes; and polyfunctional monomers such as allyl methacrylate, diallyl phthalate, triallyl cyanurate, monoethyleneglycol dimethacrylate, tetraethyleneglycol dimethacrylate, tetraethyleneglycol dimethacrylate, and divinyl benzene. These vinyl-based monomers may be used singly or in combination of two or more of them.

The methyl methacrylate polymer contains methyl methacrylate in an amount of 30 to 100 wt %, preferably 50 to 99.9 wt %, more preferably 50 to 98 wt % and the monomer copolymerizable with methyl methacrylate in an amount of 70 to 0 wt %, preferably 50 to 0.1 wt %, more preferably 50 to 2 wt %. If the methyl methacrylate content is less than 30 wt %, optical characteristics, appearance, weather resistance, and heat resistance specific to acrylic resins tend to be degraded. From the viewpoint of processability and appearance, it is preferred that a polyfunctional monomer is not used.

The glass transition temperature of the resin (A) used in the present invention can be set according to use conditions and intended use, but is preferably 100° C. or higher, more preferably 110° C. or higher, even more preferably 115° C. or higher, most preferably 120° C. or higher.

A specific example of an acrylic resin having a glass transition temperature of 120° C. or higher is an acrylic resin containing a glutarimide structure, a glutaric anhydride structure, a (meth)acrylic acid unit, or a lactone ring in its molecule. Examples of such an acrylic resin include polyglutarimide acrylic resins, glutaric anhydride acrylic resins, lactonized acrylic resins, hydroxyl group- and/or carboxyl group-containing acrylic resins, and methacrylic resins. Examples of another usable resin having a glass transition temperature of 120° C. or higher include partially-hydrogenated styrene-based polymers obtained by partial hydrogenation of aromatic rings of a styrene-based polymer obtained by polymerization of a styrene monomer and another monomer copolymerizable therewith, polymers containing a cyclic acid anhydride repeating unit, polyethylene terephthalate resins, and polybutylene terephthalate resins. Among them, a glutarimide acrylic resin (D) that will be described below is particularly preferably used because a resulting film has improved heat resistance and also has excellent optical characteristics when stretched.

(Glutarimide Acrylic Resin (D))

The glutarimide acrylic resin (D) has a glass transition temperature of 120° C. or higher and contains a unit represented by the following general formula (1) and a unit represented by the following general formula (2):

[Chemical Formula 10]

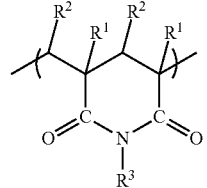

(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms. Hereinafter, the unit represented by the above general formula (1) is also referred to as "glutarimide unit".

In the above general formula (1), $R^1$ and $R^2$ are preferably each independently hydrogen or a methyl group and $R^3$ is preferably hydrogen, a methyl group, a butyl group, or a cyclohexyl group, and $R^1$, $R^2$, and $R^3$ are more preferably a methyl group, hydrogen, and a methyl group, respectively.

The glutarimide acrylic resin (D) may contain only one kind of glutarimide unit or two or more kinds of glutarimide units between which any one of $R^1$, $R^2$, and $R^3$ in the above general formula (1) is different or all of them are different.

The glutarimide unit can be formed by imidizing a (meth)acrylate unit represented by the following general formula (2). Alternatively, the glutarimide unit may be formed by imidizing an acid anhydride such as maleic anhydride, a half ester obtained from the acid anhydride and a linear or branched alcohol having 1 to 20 carbon atoms, or α,β-ethylenic unsaturated carboxylic acid (e.g., acrylic acid, methacrylic acid, maleic acid, itaconic acid, crotonic acid, fumaric acid, citraconic acid).

The glutarimide unit content of the glutarimide acrylic resin (D) is not particularly limited, and can be appropriately determined in consideration of, for example, the structure of $R^3$. However, the glutarimide unit content is preferably 1.0 wt % or more, more preferably 3.0 wt % to 90 wt %, even more preferably 5.0 wt % to 60 wt % with respect to the total weight of the glutarimide acrylic resin (D). If the glutarimide unit content is less than the above lower limit, a resulting glutarimide acrylic resin (D) tends to be poor in heat resistance or tends to have impaired transparency. On the other hand, if the glutarimide unit content exceeds the above upper limit, heat resistance and melt viscosity become unnecessarily high, which tends to deteriorate molding processability, significantly decrease the mechanical strength of a resulting film when the film is processed, or impair transparency.

The glutarimide unit content is calculated in the following manner.

The resin is subjected to $^1$H-NMR analysis using $^1$H-NMR BRUKER Avance III (400 MHz) to determine the amount (mol %) of each monomer unit, such as a glutarimide unit or an ester unit, contained in the resin, and then the monomer unit content (mol %) is converted to a monomer unit content (wt %) using the molecular weight of each monomer unit.

For example, when the resin is composed of a glutarimide unit whose $R^3$ in the above general formula (1) is a methyl group and a methyl methacrylate unit, a glutarimide unit content (wt %) can be determined from the following calculation formula using the area a of a peak derived from protons of O—$CH_3$ of methyl methacrylate and appearing at about 3.5 to 3.8 ppm and the area b of a peak derived from protons of N—$CH_3$ of glutarimide and appearing at about 3.0 to 3.3 ppm.

[Methyl methacrylate unit content $A$(mol %)]= 100×$a$/($a+b$)

[Glutarimide unit content $B$(mol %)]=100×$b$/($a+b$)

[Glutarimide unit content(wt %)]=100×($b$×(molecular weight of glutarimide unit)/($a$×(molecular weight of methyl methacrylate unit)+$b$×(molecular weight of glutarimide unit))

It is to be noted that even when the resin contains a monomer unit other than the above units, the glutarimide unit content (wt %) can be determined in the same manner as described above from the amount (mol %) of each monomer unit contained in the resin and the molecular weight of each monomer unit.

When the non-birefringent resin material according to the present invention is used for, for example, a polarizer protective film, the glutarimide unit content is preferably 20 wt % or less, more preferably 15 wt % or less, even more preferably 10 wt % or less because birefringence is more likely to be suppressed.

[Chemical Formula 11]

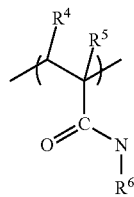

(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms. Hereinafter, the unit represented by the above general formula (2) is also referred to as "(meth)acrylate unit". It is to be noted that in this specification, "(meth)acryl" refers to "methacryl or acryl".

In the above general formula (2), $R^4$ and $R^5$ are preferably each independently hydrogen or a methyl group and $R^6$ is preferably hydrogen or a methyl group, and $R^4$, $R^5$, and $R^6$ are more preferably hydrogen, a methyl group, and a methyl group, respectively.

The glutarimide acrylic resin (D) may contain only one kind of (meth)acrylate unit or two or more kinds of (meth)acrylate units between which any one of $R^4$, $R^5$, and $R^6$ in the above general formula (2) is different or all of them are different.

If necessary, the glutarimide acrylic resin (D) may further contain a unit represented by the following general formula (3) (hereinafter, also referred to as "aromatic vinyl unit"):

[Chemical Formula 12]

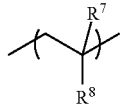

(3)

wherein $R^7$ is hydrogen or an alkyl group having 1 to 8 carbon atoms and $R^8$ is an aryl group having 6 to 10 carbon atoms.

The aromatic vinyl unit represented by the above general formula (3) is not particularly limited, and examples thereof include a styrene unit and an α-styrene unit. The aromatic vinyl unit is preferably a styrene unit.

The glutarimide acrylic resin (D) may contain only one kind of aromatic vinyl unit or two or more kinds of aromatic vinyl units between which one of $R^7$ and $R^8$ is different or both of them are different.

The aromatic vinyl unit content of the glutarimide acrylic resin (D) is not particularly limited, but is preferably 0 to 50 wt %, more preferably 0 to 20 wt %, particularly preferably 0 to 15 wt % with respect to the total weight of the glutarimide acrylic resin (D). If the aromatic vinyl unit content exceeds the above upper limit, the glutarimide acrylic resin (D) cannot have sufficient heat resistance.

However, in the present invention, the glutarimide acrylic resin (D) preferably contains no aromatic vinyl unit from the viewpoint of improving bending resistance and transparency, reducing fish-eyes, and improving solvent resistance or weather resistance.

If necessary, the glutarimide acrylic resin (D) may further contain another unit other than the glutarimide unit, the (meth)acrylate unit, and the aromatic vinyl unit.

Examples of the another unit include amide-based units such as acrylamide and methacrylamide, a glutaric anhydride unit, nitrile-based units such as acrylonitrile and methacrylonitrile, and maleimide-based units such as maleimide, N-methylmaleimide, N-phenylmaleimide, and N-cyclohexylmaleimide.

The another unit may be incorporated into the glutarimide acrylic resin (D) by random copolymerization or graft copolymerization.

The another unit may be incorporated by copolymerization of a monomer constituting the another unit with the glutarimide acrylic resin (D) and/or a resin as a raw material for producing the resin (D). Alternatively, the another unit incorporated into the resin (D) may be a by-product of the above-described imidization reaction.

The weight-average molecular weight of the glutarimide acrylic resin (D) is not particularly limited, but is preferably in the range of $1\times10^4$ to $5\times10^5$. By setting the weight-average molecular weight of the glutarimide acrylic resin (D) to a value within the above range, it is possible to prevent deterioration of molding processability or to prevent a resulting film from having poor mechanical strength when the film is processed. If the weight-average molecular weight is less than the above lower limit, a resulting film tends to have poor mechanical strength. On the other hand if the weight-average molecular weight exceeds the above upper limit, viscosity during melt extrusion tends to be high, molding processability tends to be deteriorated, and molded article productivity tends to be reduced.

The glass transition temperature of the glutarimide acrylic resin (D) is preferably 120° C. or higher so that a resulting film can have excellent heat resistance. More preferably, the glass transition temperature of the glutarimide acrylic resin (D) is 125° C. or higher. If the glass transition temperature of the glutarimide acrylic resin (D) is lower than the above lower limit, a resulting film cannot have sufficient heat resistance.

Hereinbelow, one example of a method for producing the glutarimide acrylic resin (D) will be described.

First, a (meth)acrylate polymer is produced by polymerization of (meth)acrylate. When the glutarimide acrylic resin (D) contains an aromatic vinyl unit, a (meth)acrylate-aromatic vinyl copolymer is produced by copolymerization of (meth)acrylate and an aromatic vinyl compound.

The (meth)acrylate used in this step is preferably, for example, methyl (meth)acrylate, ethyl (meth)acrylate, butyl (meth)acrylate, isobutyl (meth)acrylate, t-butyl (meth)acrylate, benzyl (meth)acrylate, or cyclohexyl (meth)acrylate, and is more preferably methyl methacrylate.

These (meth)acrylates may be used singly or in combination of two or more of them. The use of two or more kinds of (meth)acrylates makes it possible to finally obtain a glutarimide acrylic resin (D) containing two or more kinds of (meth)acrylate units.

The structure of the (meth)acrylate polymer or the (meth)acrylate-aromatic vinyl copolymer is not particularly limited as long as a subsequent imidization reaction can be performed. More specifically, the (meth)acrylate polymer or the (meth)acrylate-aromatic vinyl copolymer may be a linear polymer, a block polymer, a core-shell polymer, a branched polymer, a ladder polymer, or a cross-linked polymer.

In the case of a block polymer, the block polymer may be any one of an A-B-type block polymer, an A-B-C-type block polymer, an A-B-A-type block polymer, or another type of block polymer. In the case of a core-shell polymer, the core-shell polymer may be one composed of only one core layer and one shell layer or one whose core and/or shell are/is multi-layered.

Then, the (meth)acrylate polymer or the (meth)acrylate-aromatic vinyl copolymer is reacted with an imidization agent to perform an imidization reaction. In this way, a glutarimide acrylic resin (D) can be produced.

The imidization agent is not particularly limited as long as the glutarimide unit represented by the above general formula (1) can be produced. More specifically, ammonia or a primary amine can be used. Examples of the primary amine include: aliphatic hydrocarbon group-containing primary amines such as methylamine, ethylamine, n-propylamine, i-propylamine, n-butylamine, i-butylamine, tert-butylamine, and n-hexylamine; aromatic hydrocarbon group-containing primary amines such as aniline, benzylamine, toluidine, and trichloroaniline; and alicyclic hydrocarbon group-containing primary amines such as cyclohexylamine.

The imidization agent may be a urea-based compound that generates ammonia or a primary amine by heating, and examples of such a compound include urea, 1,3-dimethyl urea, 1,3-diethyl urea, and 1,3-dipropyl urea.

Among these imidization agents, ammonia, methylamine, and cyclohexylamine are preferably used, and methylamine is particularly preferably used from the viewpoint of cost and physical properties.

In this imidization step, a ring-closing promoter may be added in addition to the imidization agent, if necessary.

In this imidization step, the glutarimide unit content of a resulting glutarimide acrylic resin (D) can be adjusted by adjusting the ratio of the imidization agent added.

A method for performing the imidization reaction is not particularly limited, and a conventionally-known method can be used. For example, the imidization reaction is allowed to proceed by using an extruder or a batch-type reactor (pressure vessel).

The extruder is not particularly limited, and various extruders such as a single-screw extruder, a twin-screw extruder, and a multi-screw extruder can be used.

Among them, a twin-screw extruder is preferably used. The use of a twin-screw extruder makes it possible to promote mixing of the raw material polymer and the imidization agent (when a ring-closing promoter is used, mixing of the raw material polymer, the imidization agent, and the ring-closing agent).

Examples of the twin-screw extruder include a non-intermeshing co-rotating twin-screw extruder, an intermeshing co-rotating twin-screw extruder, a non-intermeshing counter-rotating twin-screw extruder, and an intermeshing counter-rotating twin-screw extruder. Among them, an intermeshing co-rotating twin-screw extruder is preferred. The screws of an intermeshing co-rotating twin-screw extruder can rotate at high speed, and therefore mixing of the raw material polymer and the imidization agent (when a ring-closing promoter is used, mixing of the raw material polymer, the imidization agent, and the ring-closing promoter) can be further promoted.

The above-mentioned extruders may be used singly or in combination of two or more of them serially connected.

The glutarimide acrylic resin (D) production method may include, in addition to the above-described imidization step, an esterification step in which treatment using an esterification agent is performed. The esterification step makes it possible to convert carboxyl groups contained in the resin as a by-product of the imidization step to ester groups. This makes it possible to adjust the acid value of the glutarimide acrylic resin (D) to a value within a desired range.

The acid value of the glutarimide acrylic resin (D) is not particularly limited, but is preferably 0.50 mmol/g or less, more preferably 0.45 mmol/g or less. The lower limit of the acid value is not particularly limited, but is preferably 0 mmol/g or more, more preferably 0.05 mmol/g or more, particularly preferably 0.10 mmol/g or more. By setting the acid value to a value within the above range, the glutarimide acrylic resin (D) can offer an excellent balance of heat resistance, mechanical properties, and molding processability. On the other hand, if the acid value exceeds the above upper limit, foaming of the resin is likely to occur during melt extrusion for film formation, which tends to deteriorate molding processability and to reduce molded article productivity. It is to be noted that the acid value can be calculated by, for example, a titration method described in JP-A-2005-23272.

The esterification agent is not particularly limited, and examples thereof include dimethyl carbonate, 2,2-dimethoxypropane, dimethylsulfoxide, triethyl orthoformate, trimethyl orthoacetate, trimethyl orthoformate, diphenyl carbonate, dimethyl sulfate, methyl toluene sulfonate, methyl trifluoromethyl sulfonate, methyl acetate, methanol, ethanol, methyl isocyanate, p-chlorophenyl isocyanate, dimethylcarbodiimide, dimethyl-t-butylsilylchloride, isopropenyl acetate, dimethyl urea, tetramethylammonium hydroxide, dimethyldiethoxysilane, tetra-N-butoxysilane, dimethyl (trimethylsilane) phosphite, trimethyl phosphite, trimethyl phosphate, tricresyl phosphate, diazomethane, ethylene oxide, propylene oxide, cyclohexene oxide, 2-ethylhexyl glycidyl ether, phenyl glycidyl ether, and benzyl glycidyl ether. Among them, dimethyl carbonate and trimethyl orthoacetate are preferred from the viewpoint of cost and reactivity, and dimethyl carbonate is particularly preferred from the viewpoint of cost.

The amount of the esterification agent to be used is not particularly limited, but is preferably 0 to 12 parts by weight, more preferably 0 to 8 parts by weight per 100 parts by weight of the (meth)acrylate polymer or the (meth)acrylate-aromatic vinyl polymer. By setting the amount of the esterification agent to be used to a value within the above range, it is possible to adjust the acid value of the glutarimide acrylic resin (D) to a value within an appropriate range. On the other hand, if the amount of the esterification agent to be used is not within the above range, there is a possibility that part of the esterification agent will remain unreacted in the resin, which may cause foaming or odor generation when molding is performed using the resin.

A catalyst may also be used in combination with the esterification agent. The type of catalyst to be used is not particularly limited, and examples of the catalyst include aliphatic tertiary amines such as trimethylamine, triethylamine, and tributylamine. Among them, triethylamine is preferred from the viewpoint of cost, reactivity, etc.

As in the case of the imidization step, the esterification step is allowed to proceed using, for example, an extruder or a batch-type reactor.

This esterification step may be performed only by heat treatment without using the esterification agent. The heat treatment can be achieved by kneading and dispersing the melted resin in an extruder. When only the heat treatment is performed as the esterification step, some or all of carboxyl groups contained in the resin as a by-product of the imidization step can be turned into acid anhydride groups by, for example, a dehydration reaction between carboxyl groups in the resin and/or a dealcoholization reaction between a carboxyl group in the resin and an alkyl ester group in the resin. At this time, a ring-closing promoter (catalyst) may also be used.

Even when the esterification step is performed using the esterification agent, conversion to acid anhydride groups by heat treatment can be allowed to proceed in parallel.

In both the imidization step and the esterification step, an extruder used is preferably equipped with a vent port so that the pressure in the extruder can be reduced to atmospheric pressure or less. The use of such a machine makes it possible to remove unreacted part of the imidization agent, unreacted part of the esterification agent, a by-product such as methanol, or monomers.

The glutarimide acrylic resin (D) can also be appropriately produced using, instead of an extruder, a high-viscosity reaction apparatus such as a horizontal twin screw reaction apparatus, such as BIVOLAK manufactured by Sumitomo Heavy Industries, Ltd., or a vertical twin screw mixing vessel such as SUPER BLEND.

When the glutarimide acrylic resin (D) is produced using a batch-type reactor (pressure vessel), the structure of the batch-type reactor (pressure vessel) is not particularly limited. More specifically, the batch-type reactor shall have a structure in which the raw material polymer can be melted by heating and stirred and the imidization agent (when a ring-closing promoter is used, the imidization agent and the ring-closing promoter) can be added, but preferably has a structure excellent in stirring efficiency. The use of such a batch-type reactor makes it possible to prevent insufficient stirring due to an increase in polymer viscosity with the progress of reaction. Example of a batch-type reactor having such a structure include a mixing vessel MAX BLEND manufactured by Sumitomo Heavy Industries, Ltd. and the like.

In such a way as described above, the glutarimide acrylic resin (D) whose glutarimide unit content is controlled to a specific value can be easily produced.

(Polymer (B))

The polymer (B) used in the present invention is an essential component to allow the non-birefringent resin material to have high optical isotropy, because addition of the polymer (B) to the resin (A) makes it possible to reduce both orientation birefringence and photoelastic constant. In order to achieve optical isotropy, how to reduce orientation birefringence and photoelastic birefringence is important. Therefore, the concepts of "orientation birefringence" and "photoelastic birefringence" of each of the resin (A), the polymer (B), the non-birefringent resin material, and the film in the present invention will be first described below.

(Concept of Orientation Birefringence)

When a film is produced not by molding performed under such conditions that a polymer is oriented in a film, such as high discharge conditions, film drawing conditions, or low temperature conditions, but by normal melt extrusion molding, a polymer is not very highly oriented in the film. Actually, in the case of an acrylic resin typified by PMMA, its film formed by melt extrusion without intentionally subjected to a stretching process (hereinafter, also referred to as "original film" or "raw material film") does not have very high birefringence, and therefore can sometimes be practically used without problem depending on its intended use. Of course, when a film is formed by molding performed under such conditions that a polymer is oriented or an original film is subjected to a stretching process, a polymer is oriented in the film so that the film has birefringence. Such birefringence is due to polymer orientation, and is therefore generally called orientation birefringence. As described above, the orientation birefringence of a molded body, especially an optical film, made of the non-birefringent resin material according to the present invention depends on how the non-birefringent resin material according to the present invention is molded or, in the case of a film, whether the film is stretched or not. In order to reduce the birefringence of the molded body, especially the optical film, it is necessary to set the orientation birefringence of the polymer (B) and the orientation birefringence of the resin (A). On the other hand, when polymer orientation hardly occurs in a molded body such as a film so that the birefringence of the molded body is sufficiently low, the orientation birefringence of the polymer (B) does not need to be greatly taken into consideration and is therefore not particularly limited when resin design is performed.

The measuring conditions of "orientation birefringence" in the present invention will be defined as follows. As described above, orientation birefringence develops due to orientation of polymer chains, but birefringence (orientation birefringence) in a polymer film varies depending on the degree of orientation of polymer chains. Therefore, in the present invention, "orientation birefringence" is measured under conditions defined as follows.

Each of the resin (A), the polymer (B), and the non-birefringent resin material needs to be formed into a some form of molded body to measure its orientation birefringence. In the present invention, the molded body is defined as a film or sheet. Hereinbelow, measurement of "orientation birefringence" will be described with reference to a case where the molded body is a melt-extrusion molded film or a press-molded sheet.

Measurement of "Orientation Birefringence" of Film

First, a test specimen of 25 mm×90 mm is cut out (so that its longitudinal direction is parallel to MD) from a film (original film) having a film thickness of 125 μm, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C., and a sample is taken from the central portion of the film to measure birefringence.

Measurement of "Orientation Birefringence" of Sheet

When the polymer (B) has at least a cross-linked structure, it is difficult to form a film only from the polymer (B) depending on the structure of the polymer (B). In this case, the polymer (B) is formed into a sheet by press molding to measure "orientation birefringence". Also when it is difficult to form a film from, for example, the resin (A) as in the case of the polymer (B), a sheet is formed by press molding to measure orientation birefringence.

Hereinbelow, the measuring conditions of "orientation birefringence" at the time when a sheet formed by press molding is used will be described.

The polymer (B) is pressed at 190° C. to prepare a press-molded sheet having a thickness of 500 μm. A test specimen of 25 mm×90 mm is cut out from the central portion of the obtained press-molded sheet, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C., and a sample is taken from the central portion of the film to measure birefringence and determine the sign of orientation birefringence.

The above-described "orientation birefringence" depends on the degree of polymer orientation, and is therefore influenced by various sample preparation conditions including stretching conditions. For this reason, evaluation conditions have been specified above. For example, the stretching temperature is preferably in the range of −30° C. to +30° C. of the glass transition temperature, more preferably in the range of +0° C. to +30° C. of the glass transition temperature, and may be appropriately set to a temperature in the range of, for example, +5° C. to +30° C. of the glass transition temperature. However, in order to determine the sign of birefringence of each sample and to quantitatively determine the relative magnitude relationship between samples, it is important to use measurement values obtained under the almost same measuring conditions such as stretching conditions.

(Concept of Photoelastic Birefringence (Photoelastic Constant))

As has been described above, photoelastic birefringence is birefringence caused by elastic deformation (distortion) of a polymer in a molded body when stress is applied to the molded body. In fact, the intrinsic "photoelastic constant" of the polymer is determined, which makes it possible to evaluate the degree of photoelastic birefringence of the material. First, stress is applied to the polymer material and birefringence is measured when the polymer material is elastically distorted. A proportional constant between the obtained birefringence and the stress is defined as a photoelastic constant. The birefringences of polymers at the time when stress is applied to the polymers can be evaluated by comparing the photoelastic constants of the polymers.

As in the case of the above-described "orientation birefringence", each of the resin (A), the polymer (B), and the non-birefringent resin material needs to be formed into a some form of molded body to measure its photoelastic birefringence. In the present invention, the molded body is defined as a film or sheet. Hereinbelow, the measurement of "photoelastic constant" will be described with reference to a case where the molded body is a melt-extrusion molded film or a press-molded sheet.

Measurement of "Photoelastic Constant" of Film

As in the case of the above-described "orientation birefringence", a strip-shaped test specimen of 15 mm×90 mm is cut out (so that its longitudinal direction is parallel to TD) from a film (original film) having a film thickness of 125 μm. Then, one of the long sides of the test specimen is fixed, and in this state, birefringence is measured at 23° C. while a load applied to the other long side is increased from 0 kgf to 4 kgf by 0.5-kgf increments. The magnitude of a change in birefringence per unit stress is calculated from the obtained result to determine a photoelastic constant.

Measurement of "Photoelastic Constant" of Sheet

As in the case of the above-described "orientation birefringence", the polymer (B) is formed into a sheet by press molding to measure its birefringence to determine a photoelastic constant. Also when it is difficult to form a film from, for example, the resin (A) as in the case of the polymer (B), a sheet is formed by press molding to measure photoelastic birefringence.

Hereinbelow, measurement of "photoelastic constant" at the time when a press-molded sheet is used will be described.

The polymer (B) is pressed at 190° C. to prepare a press-molded sheet having a thickness of 500 μm. Then, a test specimen of 25 mm×90 mm is cut out from the central portion of the obtained press-molded sheet. The measuring conditions and calculation method of "photoelastic constant" are the same as those used in the case of the above-described melt-extrusion molded film.

When there is a large difference in thickness between samples to be compared in the measurement of photoelastic birefringences of films and/or sheets, there is a possibility that the samples are different from each other in how stress is applied, and therefore there is a case where it is difficult to strictly compare photoelastic constants between the samples. However, there is not a large difference in how stress is applied between the sample of the film having a thickness of 125 μm and the sample of the press-molded sheet having a thickness of 500 μm described in the present invention, and therefore it is possible to compare photoelastic constants between samples when a difference in thickness between the samples is at such a level as described above. Therefore, both the above-described film and press-molded sheet can be appropriately used to measure a photoelastic constant (birefringence), but the film is preferably used. In the present invention, a press-molded sheet having a thickness of 500 μm is used as a means for determining the sign of photoelastic constant of the polymer (B). The same applies to orientation birefringence.

The photoelastic birefringence of a polymer is a property intrinsic to the structure of the polymer, and therefore when the photoelastic constant of the resin (A) is large, the photoelastic constant of the polymer (B) needs to be opposite in sign to the photoelastic constant of the resin (A). Further, the polymer (B) needs to be added in such an amount that the photoelastic birefringence of the resin (A) can be cancelled out. It is known that additivity is established between the photoelastic constant of a resulting polymer (copolymer) and the photoelastic constants of homopolymers corresponding to monomer species used for copolymerization. Therefore, when the photoelastic constant of the polymer (B) is opposite in sign to the photoelastic constant of the resin (A) and is larger, the amount of the polymer (B) that needs to be added to reduce the photoelastic birefringence of the non-birefringent resin material composed of the resin (A) and the polymer (B) and the photoelastic birefringence of the film thereof can be made smaller.

As for orientation birefringence, as described above, when the degree of polymer orientation in a molded body, especially an optical film, made of the non-birefringent resin material according to the present invention is not so high and therefore the orientation birefringence of the molded body does not become a problem when the molded body is practically used, it is not particularly necessary to take the orientation birefringence of the polymer (B) into consideration when the polymer (B) is designed. However when the orientation birefringence of the resulting molded body becomes a problem when the molded body is practically used, the orientation birefringence of the polymer (B) needs to be made opposite in sign to the orientation birefringence of the resin (A).

The above-described technical idea is important to reduce birefringence to provide the non-birefringent resin material and film according to the present invention.

The polymer (B) used in the present invention shall be a polymer having a weight-average molecular weight exceeding 5000, preferably 10000 or more, more preferably 20000 or more. If the weight-average molecular weight is less than 5000, there is a fear that the physical properties, such as mechanical properties, heat resistance, and hardness, of a resulting molded body are deteriorated or the appearance of a resulting molded body is impaired due to bleeding out on the surface of the molded body during high-temperature molding processing.

The polymer (B) preferably has a cross-linked structure in part thereof from the viewpoint of improving mechanical strength, and may be, for example, a multi-layered polymer having a cross-linked polymer layer. The polymer (B) preferably has a hard polymer part from the viewpoint of heat resistance, and preferably has a non-crosslinked structure from the viewpoint of reducing birefringence, and particularly preferably has a hard polymer part having a non-crosslinked structure. For example, the polymer (B) may be a multi-layered polymer having a hard polymer layer. The polymer (B) is more preferably a multi-layered polymer containing a cross-linked polymer layer and a hard polymer layer. In general, a multi-layered polymer is also referred to as a graft copolymer or a core-shell polymer, and the polymer (B) used in the present invention includes these polymers.

In U.S. Pat. No. 4,373,065, the two kinds of polymers are very different in structure, and are therefore basically less likely to be completely miscible with each other. In fact, when the two kinds of non-crosslinked polymers are blended, one of the polymers aggregates so that micron-sized domains or clearly-visible large clusters and then surface irregularities are formed, which impairs transparency or causes defects such as fish-eyes. Therefore, in order to allow two kinds of polymers to be easily completely miscible with each other, polymer design needs to be performed in consideration of two factors of birefringence control and miscibility control, which significantly reduces the degree of freedom of polymer design. Under the circumstances, the polymer (B) used in the present invention exhibits its characteristics. In the present invention, when the polymer (B) has a cross-linked polymer (layer) and a hard polymer (layer) and is designed so that each microparticle of the polymer (B) has a submicron size, a blend of the resin (A) and the polymer (B) has a sea-island structure in which submicron-sized microparticles of the polymer (B) are dispersed in the resin (A) as a matrix, and therefore the polymer (B) is less likely to endlessly aggregate to form clusters of several millimeters or centimeters that impairs transparency or causes defects such as fish-eyes. As described above, the polymer (B) is previously designed to have a submicron size so that the dispersibility of the polymer (B) in the matrix can be controlled, and therefore the polymer (B) can be dispersed in the matrix even when the resin (A) and the polymer (B) are not completely miscible with each other. This increases the degree of freedom of polymer design of both the resin (A) as a matrix and the polymer (B). For example, importance can be imposed on birefringence control when polymer design is performed. This is the second important technical idea.

Hereinbelow, the third important technical idea of the present invention will be described. There is a case where a molded body, especially an optical film, made of the non-birefringent resin material according to the present invention needs to have high heat resistance and mechanical strength. Particularly, when used as an optical film for liquid crystal displays, the molded body needs to have high heat resistance, because it is exposed to high temperature when subjected to a film coating process or the like during production as well as when practically used. Further, the molded body needs to have mechanical strength such as trimming property or crack resistance, because a punching process or the like is performed after film coating or bonding to another member as well as during film production. In this case, addition of the polymer (B) whose cross-linked polymer layer is "soft" to the resin (A) as a matrix makes it possible to significantly improve mechanical strength and achieve high heat resistance at the same time. In order to obtain such an effect, the polymer (B) is preferably a graft copolymer (core-shell polymer) having a soft cross-linked polymer layer and a hard polymer layer. Usually, addition of a soft polymer is performed as one of the ways to improve mechanical strength, but in this case, a matrix resin (in this case, the resin (A)) and the soft polymer are uniformly mixed, which is disadvantageous in that a resulting molded body has low heat resistance. On the other hand, when the polymer (B) is a graft copolymer (core-shell polymer) having a soft cross-linked polymer layer and a hard polymer layer, a resulting molded body has a discontinuous sea-island structure in which the soft cross-linked polymer layer is "island" and the resin (A) and the hard polymer layer are "sea", and therefore it is possible to obtain an excellent effect that mechanical strength is improved and heat resistance is hardly reduced. Usually, a soft cross-linked polymer is different in composition from a matrix (resin(A)), and therefore it is difficult to uniformly disperse the soft cross-linked polymer in the matrix, which deteriorates optical characteristics such as transparency or causes defects such as fish-eyes. However, as described above, when the polymer (B) is a graft copolymer having both a soft cross-linked polymer layer and a hard polymer layer, it is possible to uniformly disperse the soft cross-linked polymer in the matrix.

The term "soft" used herein means that the glass transition temperature of the polymer is lower than 20° C. From the viewpoint of enhancing the impact absorption capacity of the soft layer and enhancing an impact resistance improving effect such as crack resistance, the glass transition temperature of the polymer is preferably lower than 0° C., more preferably lower than −20° C.

Further, the term "hard" used herein means that the glass transition temperature of the polymer is 20° C. or higher. If the glass transition temperature of the polymer is lower than 20° C., the non-birefringent resin material and the film that contain the polymer (B) have low heat resistance or there is a problem that coarsening or agglomeration of the polymer (B) is likely to occur during production of the polymer (B).

In this specification, the glass transition temperature of the "soft" or "hard" polymer is calculated by Fox equation using a value described in Polymer Hand Book (J. Brandrup, Interscience 1989) (for example, the glass transition temperature of polymethyl methacrylate is 105° C. and the glass transition temperature of polybutyl acrylate is −54° C.).

When a molded body and a film that are made of the non-birefringent resin material according to the present invention do not need to have very high mechanical strength, the cross-linked polymer layer may be either "soft" or "hard", and the definition of "soft" or "hard" is the same as that described above.

In this specification, a graft ratio is used as a parameter to express the degree of covalent bonding of the hard polymer layer to the cross-linked polymer layer in the polymer (B).

The graft ratio of the polymer (B) is an index representing the weight ratio of the grafted hard polymer layer to the cross-linked polymer layer when the weight of the cross-linked polymer layer is regarded as 100. The graft ratio is preferably 10 to 250%, more preferably 40 to 230%, most preferably 60 to 220%. If the graft ratio is less than 10%, the polymer (B) is likely to aggregate in a resulting molded body so that there is a fear that transparency is impaired or defects are caused by foreign matter. Further, the tensile elongation at breakage of the film is reduced so that cracking is likely to occur when the film is cut. If the graft ratio is 250% or higher, the melt viscosity of the non-birefringent resin material during molding, for example during film formation, increases, which tends to deteriorate film formability. The calculation formula of the graft ratio will be described later in the section of Examples.

It is to be noted that there is a case where part of the hard polymer layer is not bonded (grafted) to the cross-linked polymer layer (also referred to as free polymer), but this free polymer is also included in the polymer (B).

(Description of Cross-Linked Polymer Layer)

Hereinbelow, the cross-linked polymer layer will be described with reference to a case where the polymer (B) is a graft copolymer.

1. Description of "Soft" Cross-Linked Polymer Layer

First, the "soft" cross-linked polymer layer will be described. As described above, the term "soft" shall mean that the glass transition temperature of the polymer is less than 20° C., and a rubber-like polymer is preferably used. Specific examples of the rubber-like polymer include butadiene-based cross-linked polymers, (meth)acrylic cross-linked polymers, and organosiloxane-based cross-linked polymers. Among them, (meth)acrylic cross-linked polymers are particularly preferred in terms of the weather resistance (light resistance) and transparency of the non-birefringent resin material and the film.

Hereinbelow, a (meth)acrylic cross-linked polymer layer will be described in detail as a preferred "soft" cross-linked polymer layer.

A (meth)acrylic cross-linked polymer in the (meth)acrylic cross-linked polymer layer is not particularly limited as long as it is a (meth)acrylic cross-linked polymer, but is preferably one obtained by polymerization of 50 to 100 wt % of alkyl acrylate, 50 to 0 wt % of a vinyl-based monomer copolymerizable with the alkyl acrylate, and 0.05 to 10 parts by weight of a polyfunctional monomer (per 100 parts by weight of the total amount of the alkyl acrylate and the vinyl-based monomer copolymerizable therewith) from the viewpoint of impact resistance such as crack resistance. The (meth)acrylic cross-linked polymer layer may be a layer obtained by one-step polymerization performed by mixing all the monomer components or a layer obtained by polymerization performed in two or more steps while changing the composition of monomers.

The alkyl acrylate used here is preferably one whose alkyl group has 1 to 12 carbon atoms from the viewpoint of polymerization reactivity and cost, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, benzyl acrylate, n-octyl acrylate, β-hydroxyethyl acrylate, dimethylaminoethyl acrylate, and glycidyl acrylate, and these monomers may be used singly or in combination of two or more of them. The amount of the alkyl acrylate is preferably 50 to 100 wt %, more preferably 60 to 100 wt %, most preferably 70 to 100 wt % with respect to the total amount of the monofunctional monomers (with respect to the total amount of the alkyl acrylate and the vinyl-based monomer copolymerizable therewith). If the amount of the alkyl acrylate is less than 50 wt %, there is a case where the crack resistance of the film is deteriorated.

As an example of the monomer copolymerizable with the alkyl acrylate (hereinafter, sometimes referred to as "copolymerizable monomer"), alkyl methacrylate can be mentioned. From the viewpoint of polymerizability and cost, the alkyl methacrylate is preferably one whose alkyl group has 1 to 12 carbon atoms, and the alkyl group may be linear or branched. Specific examples of the alkyl methacrylate include methyl methacrylate, ethyl methacrylate, propyl methacrylate, butyl methacrylate, 2-ethylhexyl methacrylate, benzyl methacrylate, octyl acrylate, β-hydroxyethyl methacrylate, dimethylaminoethyl methacrylate, and glycidyl methacrylate. Other examples of the copolymerizable monomer include: vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; and methacrylic acid and salts thereof such as methacrylic acid, sodium methacrylate, and calcium methacrylate. These monomers may be used in combination of two or more of them.

The above described monofunctional monomer is copolymerized with the polyfunctional monomer having two or more non-conjugated reactive double bonds per molecule, and as a result, a cross-linked polymer (rubber) is obtained. Examples of the polyfunctional monomer used here include allyl methacrylate, allyl acrylate, triallyl cyanurate, triallyl isocyanurate, diallyl phthalate, diallyl maleate, divinyl adipate, divinylbenzene, ethylene glycol dimethacrylate, ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These polyfunctional monomers may be used in combination of two or more of them.

The amount of the polyfunctional monomer to be added to the monofunctional monomers is preferably 0.05 to 10 parts by weight, more preferably 0.1 to 5 parts by weight per 100 parts by weight of the total amount of the monofunctional monomers. If the amount of the polyfunctional monomer to be added is less than 0.05 part by weight, formation of a cross-linked polymer tends to be impossible. On the other hand, if the amount of the polyfunctional monomer to be added exceeds 10 parts by weight, the film tends to have low crack resistance.

2. Description of "Hard" Cross-Linked Polymer Layer

Hereinbelow, the "hard" cross-linked polymer layer will be described. As described above, the term "hard" means that the polymer has a glass transition temperature of 20° C. or higher.

The hard polymer is not particularly limited as long as its glass transition temperature is 20° C. or higher, and more specifically, the hard polymer can be appropriately formed using the monomer described above with reference to the "soft" cross-linked polymer layer.

(Description of Hard Polymer Layer)

As described above, the "hard" polymer that forms the hard polymer layer needs to have the functions of (1) uniformly dispersing the polymer (B) in the matrix (resin (A)) and (2) cancelling out the birefringence of the resin (A) to improve the optical isotropy of the non-birefringent resin material and the film according to the present invention.

The function (1) can be achieved by forming a polymer easily miscible with the matrix component by polymerization of a monomer appropriately selected.

When the orientation birefringence of a molded body such as a film is not so high and therefore does not become a problem, such as when a molded body is not subjected to a stretching process, the function (2) can be achieved by allowing the photoelastic constant of the hard polymer to be opposite in sign to that of the matrix (resin (A)) so that the molded body has a very small photoelastic constant. On the other hand, when the orientation birefringence of a molded body such as a film is relatively large and therefore becomes a problem, such as when a molded body is subjected to a stretching process, the function (2) can be achieved by allowing both the photoelastic constant and orientation birefringence of the hard polymer to be opposite in sign to those of the matrix (resin (A)) so that not only the photoelastic constant of the molded body but also the orientation birefringence of the molded body is very low.

What is more important to achieve the function (2) is that the "hard" polymer layer is more effective than the polymer layer having a cross-linked structure at cancelling out the birefringence of the resin (A) as a matrix. Any one or more of the layers of the polymer (B), for example one or both of the cross-linked polymer layer and the hard polymer layer of the polymer (B), may have the function of cancelling out the birefringence of the resin (A), but the "hard" polymer layer is most preferred. The reason for this is considered to be that when polymer orientation occurs during molding of the matrix (resin (A)) or polymer orientation occurs by the application of stress to the matrix (resin (A)), the birefringence of the matrix can be cancelled out by orienting the polymer chains of the polymer (B) in a direction in which the polymer chains of the matrix are oriented by external force. In this case, the polymer layer having a cross-linked structure is less likely to be deformed by external force and therefore polymer chains are less likely to be oriented, that is, the polymer layer having a cross-linked structure is less effective at cancelling out the birefringence of the matrix. Of course, when the crosslink density of the polymer layer having a cross-linked structure is low, the polymer layer having a cross-linked structure is likely to be deformed by external force, and therefore the polymer layer having a cross-linked structure is also expected to be effective to some extent at cancelling out the birefringence of the matrix. For this reason, any of the polymer layers, including the cross-linked polymer layer, of the graft copolymer may have the function of cancelling out the birefringence of the matrix, but the polymer layer other than the cross-linked polymer layer or the polymer layer in which polymer chains can be oriented by external force is preferred, and more specifically the "hard" polymer layer is preferred. The "hard" polymer layer having no cross-linked structure is more preferred, and the "hard" polymer layer that is present as an outer layer of the polymer (B) so as to easily come into direct contact with the matrix and that has no cross-linked structure is even more preferred.

Hereinbelow, a description will be made with reference to a case where an outer layer of the polymer (B) is the "hard" polymer layer that is highly effective at cancelling out the birefringence of the resin (A) to improve the optical isotropy of the non-birefringent resin material and the film according to the present invention.

A monomer species that is used for forming the hard polymer layer of the polymer (B) and is suitable for cancelling out the photoelastic birefringence of the resin (A) shall be selected so that the photoelastic constant of the resin (A) and the photoelastic constant of the polymer (B) are opposite in sign to each other.

Specific examples of a monomer are given below as a reference for setting the photoelastic constant of a polymer, but the monomer species is not limited thereto (a value within [ ] represents the photoelastic constant of its homopolymer).

Monomers showing positive photoelastic birefringence:

| Benzyl methacrylate | [48.4 × 10$^{-12}$ Pa$^{-1}$] |
| Dicyclopentanyl methacrylate | [6.7 × 10$^{-12}$ Pa$^{-1}$] |
| Styrene | [10.1 × 10$^{-12}$ Pa$^{-1}$] |
| Parachlorostyrene | [29.0 × 10$^{-12}$ Pa$^{-1}$] |

Monomers showing negative photoelastic birefringence:

| Methyl methacrylate | [−4.3 × 10$^{-12}$ Pa$^{-1}$] |
| 2,2,2-trifluoroethyl methacrylate | [−1.7 × 10$^{-12}$ Pa$^{-1}$] |
| 2,2,2-trichloroethyl methacrylate | [−10.2 × 10$^{-12}$ Pa$^{-1}$] |
| Isobornyl methacrylate | [−5.8 × 10$^{-12}$ Pa$^{-1}$] |

It is known that additivity is established between the photoelastic constant of a copolymer and the photoelastic constants of homopolymers corresponding to monomer species used for copolymerization. For example, it has been reported that in the case of a binary copolymerization system of methyl methacrylate (MMA) and benzyl methacrylate (BzMA), its photoelastic birefringence becomes substantially zero when the ratio of poly-MMA/BzMA is 92/8 (wt %). The same applies to a mixture (alloy) of two or more polymers, that is, additivity is established between the photoelastic constant of a polymer mixture and the photoelastic constants of polymers. This is why it is necessary to allow the photoelastic constant of the resin (A) and the photoelastic polymer (B) to be opposite in sign and to adjust the amounts (wt %) of the resin (A) and the polymer (B) to be blended to reduce the photoelastic birefringences of the non-birefringent resin material and the film according to the present invention.

Further, it is known that additivity is established between the orientation birefringence of a copolymer and the intrinsic birefringences of homopolymers corresponding to monomer species used for copolymerization. The same applies to a mixture (alloy) of two or more polymers, that is, additivity is established between the orientation birefringence of a polymer mixture and the intrinsic birefringences of polymers. The monomer species that is used for forming the hard polymer layer of the polymer (B) and is suitable for cancelling out the orientation birefringence of the resin (A) shall be selected so that the orientation birefringence of the resin (A) and the orientation birefringence of the polymer (B) are opposite in sign. Specific examples of a monomer are given below as a reference for setting the orientation birefringence of a polymer (a value within [ ] represents the intrinsic birefringence of a homopolymer consisting of the monomer), but the monomer species is not limited thereto. It is to be noted that the term "intrinsic birefringence" refers to birefringence (orientation birefringence) when a polymer is completely oriented in one direction.

Polymers showing positive intrinsic birefringence:

| Polybenzyl methacrylate | [+0.002] |
| Polyphenylene oxide | [+0.210] |
| Bisphenol A polycarbonate | [+0.106] |
| Polyvinyl chloride | [+0.027] |
| Polyethylene terephthalate | [+0.105] |
| Polyethylene | [+0.044] |

Polymers showing negative intrinsic birefringence:

| Polymethyl methacrylate | [−0.0043] |
| Polystyrene | [−0.100] |

Although the data of photoelastic constants and orientation birefringences of some polymers is shown above, both the birefringences are not always the same in sign depending on the type of polymer. For example, some polymers have a "positive" orientation birefringence and a "negative" photoelastic constant. The signs of the orientation birefringence and photoelastic birefringence (constant) of some homopolymers are shown in the following Table 1 as examples.

TABLE 1

| Homopolymer | Sign of orientation birefringence | Sign of photoelastic constant |
| --- | --- | --- |
| Polymethyl methacrylate (MMA) | Negative | Negative |
| Poly(2,2,2-trifluoroethyl methacrylate) (3FMA) | Positive | Negative |
| Polybenzyl methacrylate (BzMA) | Positive | Positive |

For example, it is known that the orientation birefringence of a poly(MMA/BzMA) copolymer having a composition of around 82/18 (wt %) is substantially zero and that the photoelastic birefringence (constant) of a poly(MMA/BzMA) copolymer having a composition of around 92/8 (wt %) is substantially zero. As shown above, when the resin (A) is an acrylic resin, both the orientation birefringence and the photoelastic constant thereof are often negative, and therefore benzyl methacrylate whose orientation birefringence and photoelastic birefringence are both positive is suitable for use in the polymer (B) (especially, in the hard polymer layer that is the outer layer of the polymer (B)) because the orientation birefringence of the resin (A) can be cancelled out while the photoelastic birefringence of the resin (A) is also cancelled out.

Hereinbelow, the polymer composition of the hard polymer will be described in detail.

The composition of the hard polymer is not particularly limited as long as the photoelastic birefringence and, if necessary, orientation birefringence of the resin (A) as a matrix can be cancelled out, mechanical strength and heat resistance can be improved, and the dispersibility of the polymer (B) in the resin (A) (i.e., miscibility) can be improved to reduce appearance defects such as fish-eyes. However, preferred examples of a monomer that is particularly suitable for use in forming the hard polymer include vinyl-based monomers having a ring structure such as an alicyclic structure, a heterocyclic structure, or an aromatic group in their molecular structure. Among them, vinyl-based monomers having an alicyclic structure, a heterocyclic structure, or an aromatic group are more preferred. When the monomer is a vinyl-based monomer having an alicyclic structure, the ring structure is preferably a polycyclic structure, more preferably a condensed-ring structure. More specifically, a monomer represented by the following formula (4) is preferably contained as a structural unit. Examples of the monomer having an alicyclic structure include dicyclopentanyl (meth)acrylate and dicyclopentenyloxyethyl (meth)acrylate. Examples of the monomer having an aromatic group include vinyl arenes such as styrene, α-methylstyrene, monochlorostyrene, and dichlorostyrene, benzyl (meth)acrylate, phenyl (meth)acrylate, and phenoxyethyl (meth)acrylate. Examples of the monomer having a heterocyclic structure include pentamethylpiperidinyl (meth)acrylate, tetramethylpiperidinyl (meth)acrylate, and tetrahydrofurfuryl (meth)acrylate. Among them, benzyl (meth)acrylate, dicyclopentanyl (meth)acrylate, and phenoxyethyl (meth)acrylate are preferred.

[Chemical Formula 13]

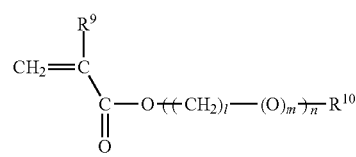

(4)

wherein $R^9$ is a hydrogen atom or a substituted or unsubstituted linear or branched alkyl group having 1 to 12 carbon atoms, and $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure. A substituent group that $R^9$ and $R^{10}$ may have is, for example, at least one selected from the group consisting of a halogen, a hydroxyl group, a carboxyl group, an alkoxy group, a carbonyl group (ketone structure), an amino group, an amide group, an epoxy group, a carbon-carbon double bond, an ester group (derivative of carboxyl group), a mercapto group, a sulfonyl group, a sulfone group, and a nitro group. Particularly, at least one selected from the group consisting of a halogen, a hydroxyl group, a carboxyl group, an alkoxy group, and a nitro group is preferred. In the above formula (4), l is an integer of 1 to 4, preferably an integer of 1 or 2, m is an integer of 0 or 1, and n is an integer of 0 to 10, preferably an integer of 0 to 2, more preferably an integer of 0 or 1.

The vinyl-based monomer having an alicyclic structure, a heterocyclic structure, or an aromatic group is preferably a (meth)acrylic monomer having an alicyclic structure, a heterocyclic structure, or an aromatic group. More specifically, the vinyl-based monomer is preferably a (meth)acrylate-based monomer represented by the formula (4) wherein $R^9$ is a substituted or unsubstituted linear or branched alkyl group having 1 carbon atom, and is more preferably a (meth)acrylate-based monomer represented by the formula (4) wherein $R^{10}$ is a substituted or unsubstituted aromatic group having 1 to 24 carbon atoms or a substituted or unsubstituted alicyclic group having 1 to 24 carbon atoms and has a homocyclic structure.

A (meth)acrylate-based monomer represented by the formula (4) wherein l is an integer of 1 or 2 and n is an integer of 0 to 2 is more preferred.

Among (meth)acrylic monomers represented by the formula (4), benzyl (meth)acrylate, dicyclopentanyl (meth)acrylate, and phenoxyethyl (meth)acrylate are preferred.

Among these monomers represented by the formula (4), benzyl (meth)acrylate is most preferred in terms of optical isotropy, miscibility with the resin (A), and moldability. Further, benzyl methacrylate has a higher glass transition temperature and is therefore more preferred in terms of heat resistance. For example, when the resin (A) is an acrylic resin, the resin (A) has a negative photoelastic constant, and therefore the use of benzyl methacrylate having a relatively large positive photoelastic constant has merits that the amount of benzyl methacrylate to be used can be reduced or the amount of the polymer (B) to be used can be reduced and that the degree of freedom of design of the non-birefringent resin material can be increased. Although there is a case where high orientation birefringence of a molded body becomes a problem when the molded body is practically used, the orientation birefringence and photoelastic birefringence of benzyl methacrylate are both positive whereas the orientation birefringence and photoelastic birefringence of an acrylic resin are both negative, and therefore the orientation birefringence of the non-birefringent resin material or the film can be reduced while the photoelastic birefringence of the non-birefringent resin material or the film is also reduced.

From the viewpoint of achieving excellent dispersibility of the polymer (B) to reduce appearance defects such as fish-eyes while maintaining excellent optical isotropy, the hard polymer having, as a structural unit, the monomer represented by the above formula (4) is preferably one obtained by polymerization of 1 to 100 wt % of the monomer represented by the above formula (4), 99 to 0 wt % of another monomer copolymerizable therewith, and 0 to 2.0 parts by weight of a polyfunctional monomer (per 100 parts by weight of the total amount of the monomer represented by the above formula (4) and the another monomer copolymerizable therewith). The hard polymer layer may be one obtained by one-step polymerization performed by mixing all the monomers or one obtained by polymerization performed in two or more steps by changing the composition of monomers.

In the present invention, any one of benzyl methacrylate, benzyl acrylate, dicyclopentanyl (meth)acrylate, and phenoxyethyl (meth)acrylate can be preferably used as the monomer represented by the above formula (4), and these monomers may be used singly or in combination of two or more of them. When the non-birefringent resin material or the film is used in applications requiring higher heat resistance, benzyl methacrylate is more preferably used from the viewpoint of glass transition temperature.

As an example of the another monomer copolymerizable with the monomer represented by the above formula (4), alkyl methacrylate can be mentioned. From the viewpoint of polymerizability or cost, the alkyl methacrylate is preferably one whose alkyl group has 1 to 12 carbon atoms, and the alkyl group may be either linear or branched. Specific examples of the alkyl methacrylate include methyl methacrylate, ethyl methacrylate, propyl methacrylate, butyl methacrylate, 2-ethylhexyl methacrylate, octyl acrylate, β-hydroxyethyl methacrylate, dimethylaminoethyl methacrylate, and glycidyl methacrylate. Further, alkyl acrylate may also be preferably used. From the viewpoint of polymerization reactivity or cost, the alkyl acrylate is preferably one whose alkyl group has 1 to 12 carbon atoms, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, and glycidyl acrylate. Other examples of the copolymerizable monomer include: unsubstituted and/or substituted maleic anhydrides such as malic anhydride, citraconic anhydride, dimethyl maleic anhydride, dichloromaleic anhydride, bromomaleic anhydride, dibromomaleic anhydride, phenylmaleic anhydride, and diphenylmaleic anhydride; vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; methacrylic acid and salts thereof such as methacrylic acid, sodium methacrylate, and calcium methacrylate; and (hydroxyalkyl)acrylic esters such as methyl 2-(hydroxymethyl) acrylate, ethyl 2-(hydroxymethyl)acrylate, isopropyl 2-(hydroxymethyl)acrylate, n-butyl 2-(hydroxymethyl)acrylate, and tertiary butyl 2-(hydroxymethyl)acrylate. These monomers may be used singly or in combination of two or more of them. Among them, alkyl methacrylates and alkyl acrylates are preferred. Further, methyl methacrylate is preferred from the viewpoint of miscibility with the acrylic resin (A), and methyl acrylate, ethyl acrylate, or n-butyl acrylate is preferred from the viewpoint of suppressing zipper depolymerization.

The amount of the monomer represented by the above formula (4) to be used is preferably 1 to 100 wt %, more preferably 5 to 70 wt %, most preferably 5 to 50 wt % with respect to 100 wt % of the total amount of the monomer represented by the above formula (4) and the another monomer copolymerizable therewith.

It is to be noted that the hard polymer layer having, as a structural unit, a (meth)acrylate monomer represented by the above formula (4) may use a polyfunctional monomer having two or more non-conjugated reactive double bonds per molecule. Here, the polyfunctional monomer to be used may be the same as the polyfunctional monomer that can be used for the cross-linked polymer layer. From the viewpoint of optical isotropy and dispersibility, the amount of the polyfunctional monomer to be used for the hard polymer layer is preferably 0 to 2.0 parts by weight, more preferably 0 to 1.0 part by weight, more preferably 0 to 0.5 part by weight, even more preferably 0 to 0.04 part by weight, most preferably 0 part by weight (per 100 parts by weight of the total amount of the monomer represented by the above formula (4) and the vinyl-based monomer copolymerizable therewith).

The polymer (B) preferably has a hard polymer layer having, as a structural unit, the monomer represented by the above formula (4) in its multi-layered structure. When the polymer (B) has a hard outermost layer, the polymer (B) more preferably has a hard polymer layer having, as a structural unit, the monomer represented by the above formula (4) as the outermost layer. By allowing the polymer (B) to have a hard outermost layer, it is possible to allow the polymer (B) to be more miscible with the acrylic resin (A), further reduce orientation birefringence and photoelastic constant, and easily obtain a film having excellent optical isotropy. A soft layer having a (meth)acrylic cross-linked polymer layer ((meth)acrylic rubber) may be adjacent to the inner side of the hard outermost layer.

The polymer (B) is preferably a multi-layered polymer having at least one (meth)acrylic cross-linked polymer layer and at least one hard polymer layer having, as a structural unit, the monomer represented by the above formula (4). A preferred example of such a polymer (B) is one that has a soft inner layer having a (meth)acrylic cross-linked polymer layer and a hard outer layer having a hard polymer layer having, as a structural unit, a monomer represented by the above formula (4). This example is preferred from the viewpoint of productivity. Another preferred example of the polymer (B) is one that has a hard inner layer composed of at least one hard polymer layer, a soft intermediate layer having a soft polymer layer composed of a (meth)acrylic cross-linked polymer layer, and a hard outer layer having a hard polymer layer having, as a structural unit, the monomer represented by the above formula (4). This example may further have a soft innermost layer. In the present invention, they may be appropriately used singly or in combination of two or more of them.

In this specification, the terms "soft inner layer", "soft intermediate layer", and "soft layer" (hereinafter, referred to as "soft layer") refer to an inner layer, an intermediate layer, and a layer composed of at least one soft polymer, respectively.

On the other hand, in this specification, the terms "hard outer(most) layer" and "hard inner layer" refer to an outer (most) layer and an inner layer composed of at least one hard polymer, respectively. It is to be noted that the terms "soft" and "hard" here are the same as those described above.

When the polymer (B) has a hard layer as an innermost layer, for example, when the polymer (B) has a multi-layered structure composed of a hard inner layer, a soft intermediate layer, and a hard outer layer, the innermost layer is preferably made of, for example, a hard polymer composed of 40 to 100 wt % of methacrylate, 0 to 60 wt % of acrylate, 0 to 60 wt % of an aromatic vinyl-based monomer, 0 to 10 wt % of a polyfunctional monomer, and 0 to 20 wt % of a vinyl-based monomer copolymerizable with the methacrylate, the acrylate, and the aromatic vinyl-based monomer from the viewpoint of a balance between hardness and crack resistance.

When the polymer (B) has a multi-layered structure composed of, for example, a soft inner layer having a (meth)acrylic cross-linked polymer layer and a hard outer layer having a polymer layer having, as a structural unit, the monomer represented by the above formula (4), a layer structure is generally formed in which the soft inner layer is completely covered with the outer hard polymer layer. However, depending on, for example, the weight ratio between the soft inner layer and the hard outer layer, there is a case where the amount of the hard polymer is not sufficient for forming such a layer structure. In this case, the layer structure does not always need to be complete, and a structure in which part of the soft inner layer is covered with the hard polymer as an outer part or a structure in which the hard polymer as an outer part is graft-polymerized with part of the soft inner layer may also be appropriately used. It is to be noted that the same applies to other examples of the multi-layered structure.

The volume-average particle diameter to the (meth) acrylic cross-linked polymer layer of the polymer (B) is preferably 20 to 450 nm, more preferably 20 to 300 nm, even more preferably 20 to 150 nm, most preferably 30 to 80 nm. If the volume-average particle diameter is less than 20 nm, there is a case where crack resistance is deteriorated. On the other hand, if the volume-average particle diameter exceeds 450 nm, there is a case where transparency is deteriorated. Further, from the viewpoint of resistance to whitening on bending, the volume-average particle diameter is preferably less than 80 nm. Further, from the viewpoint of trimming property, the volume-average particle diameter is preferably 20 to 450 nm, more preferably 50 to 450 nm, even more preferably 60 to 450 nm, even more preferably 100 to 450 nm. It is to be noted that the volume-average particle diameter can be measured by a dynamic scattering method using, for example, MICROTRAC UPA150 (manufactured by NIKKISO CO., LTD.). More specifically, the volume-average particle diameter to the (meth)acrylic cross-linked polymer layer of the polymer (B) refers to the volume-average particle diameter of particles formed from the center of the polymer (B) particles to the (meth)acrylic cross-linked polymer layer. When the polymer (B) has two or more (meth)acrylic cross-linked polymer layers, the average-volume particle diameter to the (meth)acrylic cross-linked polymer layer of the polymer (B) refers to a volume-average particle diameter to the (meth)acrylic cross-linked polymer layer farthest from the center of the polymer (B) particles.

The acrylic cross-linked polymer content of the polymer (B) is preferably 10 to 90 wt %, more preferably 20 to 80 wt %, even more preferably 30 to 60 wt %, most preferably 35 to 55 wt % when the amount of the polymer (B) is taken as 100 wt %. If the acrylic cross-linked polymer content is less than 10 wt %, there is a case where a resulting non-birefringent resin material has low mechanical strength such as crack resistance. On the other hand, if the acrylic cross-linked polymer content exceeds 90 wt %, the dispersibility of the polymer (B) is impaired and a resulting molded body cannot have a smooth surface, which tends to cause appearance defects such as fish-eyes. Further, the hard polymer content is not sufficient, which tends to increase orientation birefringence or photoelastic constant so that optical isotropy cannot be maintained.

A method for producing the polymer (B) is not particularly limited, and a known emulsion polymerization method, emulsion-suspension polymerization method, suspension polymerization method, bulk polymerization method, or solution polymerization method can be used. However, the polymer (B) is particularly preferably produced by an emulsion polymerization method.

The polymer (B) is preferably obtained by multistep polymerization. More specifically, a (meth)acrylic rubber-containing graft copolymer obtained by multistep polymerization can be preferably used as the polymer (B), which is obtained by performing, as at least one of the steps of the multistep polymerization, polymerization of a mixture containing the monomer represented by the above formula (4) and another monomer copolymerizable therewith in the presence of (meth)acrylic rubber-containing polymer particles.

The amount of the monomer represented by the above formula (4) contained in the mixture containing the monomer represented by the above formula (4) and another monomer copolymerizable therewith is preferably 1 to 100 wt %, more preferably 5 to 70 wt %, most preferably 5 to 50 wt % with respect to 100 wt % of the total amount of the monomer represented by the above formula (4) and another monomer copolymerizable therewith. The mixture may contain a polyfunctional monomer, and the amount of the polyfunctional monomer to be used is preferably 0 to 2.0 parts by weight, more preferably 0 to 1.0 part by weight, even more preferably 0 to 0.5 part by weight, even more preferably 0 to 0.04 part by weight, most preferably 0 part by weight per 100 parts by weight of the total amount of the monomer represented by the above formula (4) and the another monomer copolymerizable therewith. By the polymerization of the mixture, a hard polymer having, as a structural unit, the monomer represented by the above formula (4) is formed. Examples of the another monomer copolymerizable with the monomer represented by the above formula (4) are the same as those mentioned above, and these examples can be preferably used. The preferred amount of the another monomer copolymerizable with the monomer represented by the above formula (4) contained in the mixture is the same as that described above. Examples of the polyfunctional monomer are the same as those mentioned above, and these examples can be preferably used.

The (meth)acrylic rubber-containing polymer particles shall be polymer particles obtained by multistep polymerization and containing at least (meth)acrylic rubber. The (meth)acrylic rubber-containing polymer particles preferably have a rubber ((meth)acrylic cross-linked polymer) part obtained by polymerization of 50 to 100 wt % of alkyl acrylate, 50 to 0 wt % of another monomer copolymerizable with the alkyl acrylate, and 0.05 to 10 parts by weight of a polyfunctional monomer (per 100 parts by weight of the total amount of the alkyl acrylate and the another monomer copolymerizable therewith). The rubber part may be obtained by one-step polymerization performed by mixing all the monomer components or by polymerization performed in two or more steps by changing the composition of monomers.

The (meth)acrylic rubber-containing polymer particles are not particularly limited as long as a (meth)acrylic cross-linked polymer (rubber part) is formed in at least one of the steps of multistep polymerization, and polymerization for forming a hard polymer may be performed before and/or after the polymerization for forming a (meth)acrylic cross-linked polymer.

Particularly, from the viewpoint of productivity, the polymer (B) to be used is preferably a (meth)acrylic rubber-containing graft copolymer obtained by (b-1) polymerization of a monomer mixture of 50 to 100 wt % of alkyl acrylate, 50 to 0 wt % of a monomer copolymerizable therewith, and 0.05 to 10 parts by weight of a polyfunctional monomer (per 100 parts by weight of the total amount of the alkyl acrylate and the monomer copolymerizable therewith) to obtain (meth)acrylic rubber-containing polymer particles and then by (b-2) polymerization of a monomer mixture of 1 to 100 wt % of the monomer represented by the above formula (4), 99 to 0 wt % of another monomer copolymerizable therewith, and 0 to 2.0 parts by weight of a polyfunctional monomer (per 100 parts by weight of the total amount of the monomer represented by the above formula (4) and the another monomer copolymerizable therewith) in the presence of the (meth)acrylic rubber-containing polymer particles. Here, the polymerization of the monomer mixture in the step (b-1) and/or the polymerization of the monomer mixture in the step (b-2) may be performed in one step by mixing all the monomer components or in two or more steps by changing the composition of monomers. Further, examples of the alkyl acrylate, the monomer copolymerizable therewith, and the polyfunctional monomer used in the step (b-1) and preferred amounts thereof to be used are the same as those described above with reference to the (meth)acrylic cross-linked polymer. Examples of the components of the monomer mixture used in the step (b-2) and preferred amounts thereof to be used are the same as those described above with reference to the hard polymer layer.

The volume-average particle diameter to the (meth)acrylic rubber layer of the (meth)acrylic rubber-containing graft copolymer is measured in the same manner as the volume-average particle diameter to the (meth)acrylic cross-linked polymer layer of the polymer (B), and the preferred range thereof is also the same as that of the polymer (B).

When the polymer (B) is produced by emulsion polymerization, the emulsion polymerization can be performed by a conventional method using a known emulsifying agent. Specific examples of the emulsifying agent include anionic surfactants such as sodium alkyl sulfonate, sodium alkylbenzene sulfonate, sodium dioctylsulfosuccinate, sodium lauryl sulfate, fatty acid sodium, and phosphates such as sodium polyoxyethylene lauryl ether phosphate and non-ionic surfactants such as reaction products of alkyl phenols or aliphatic alcohols and propylene oxide or ethylene oxide. These surfactants may be used singly or in combination of two or more of them. Further, if necessary, a cationic surfactant such as an alkylamine salt may be used. Among them, a phosphate (alkali metal or alkaline earth metal) such as sodium polyoxyethylene lauryl ether phosphate is particularly preferably used for polymerization from the viewpoint of improving the heat stability of a resulting acrylic rubber polymer (B).

A multi-layered polymer latex obtained by emulsion polymerization is subjected to known treatment such as spray drying, freeze drying, or treatment in which a coagulant such as a salt (e.g., calcium chloride or magnesium chloride) or an acid (e.g., hydrochloric acid or sulfuric acid) is added to coagulate a resin component and the resin component is separated from an aqueous phase by, if necessary, performing heat treatment or the like, washed, and dried, to obtain a powdered multi-layered polymer. When the polymer latex is coagulated to obtain a multi-layered polymer, a known coagulant such as an acid or a salt can be used, but a magnesium salt, especially magnesium sulfate, is particularly preferably used as a coagulant from the viewpoint of improving heat stability during molding of a resulting copolymer.

The polymer (B) is blended so that the amount of the (meth)acrylic cross-linked polymer ((meth)acrylic rubber)) contained per 100 parts by weight of the non-birefringent resin material is preferably 1 to 60 parts by weight, more preferably 1 to 30 parts by weight, even more preferably 1 to 25 parts by weight. If the amount of the (meth)acrylic cross-linked polymer is less than 1 part by weight, there is a case where the crack resistance or vacuum moldability of the film is deteriorated or the film has poor optical isotropy due to an increase in photoelastic constant. On the other hand, if the amount of the (meth)acrylic cross-linked polymer exceeds 60 parts by weight, the heat resistance, surface hardness, transparency, or resistance to whitening on bending of the film tends to be deteriorated.

The ratio between the resin (A) and the polymer (B) to be blended is not particularly limited as long as the above-described requirement for blending is satisfied. Depending on the amount of the acrylic cross-linked polymer contained in the polymer (B), the amount of the polymer (B) to be blended is preferably 1 to 99 wt %, more preferably 1 to 80 wt %, even more preferably 1 to 60 wt % when the total amount of the resin (A) and the polymer (B) is taken as 100 wt %. If the amount of the polymer (B) to be blended is less than 1 wt %, there is a case where the crack resistance or vacuum moldability of the film is deteriorated or the film has poor optical isotropy due to an increase in photoelastic constant. On the other hand, if the amount of the polymer (B) to be blended exceeds 99 wt %, the heat resistance, surface hardness, transparency, or resistance to whitening on bending of the film tends to be deteriorated.

The non-birefringent resin material according to the present invention may be subjected to molding, such as extrusion molding, injection molding, compression molding, blow molding, or spinning molding, on heating directly in the form of particles or after pelletization using an extruder to obtain a molded article having a shape suitable for its intended use. The non-birefringent resin material according to the present invention is particularly useful as a film, and is successfully processed by, for example, a conventional melt extrusion method such as an inflation method or a T-die extrusion method, a calendering method, or a solvent casting method. Among them, a melt extrusion method using no solvents is particularly preferred. The use of a melt extrusion method makes it possible to reduce production cost or loads to the global environment or working environment caused by solvents.

From the viewpoint of obtaining a molded body that does not exhibit birefringence resulting from molding processing and can be practically used without problem, the value of orientation birefringence of the non-birefringent resin material according to the present invention is preferably $-15 \times 10^{-4}$ to $15 \times 10^{-4}$, more preferably $-10 \times 10^{-4}$ to $10 \times 10^{-4}$, even more preferably $-5 \times 10^{-4}$ to $5 \times 10^{-4}$. Further, from the viewpoint of obtaining stable optical characteristics, the value of orientation birefringence of the non-birefringent resin material according to the present invention is preferably $-1.7 \times 10^{-4}$ to $1.7 \times 10^{-4}$, more preferably $-1.6 \times 10^{-4}$ to $1.6 \times 10^{-4}$, even more preferably $-1.5 \times 10^{-4}$ to $1.5 \times 10^{-4}$, particularly preferably $-1.0 \times 10^{-4}$ to $1.0 \times 10^{-4}$, more particularly preferably $-0.5 \times 10^{-4}$ to $0.5 \times 10^{-4}$, and most preferably $-0.2 \times 10^{-4}$ to $0.2 \times 10^{-4}$.

From the viewpoint of obtaining a molded body whose birefringence resulting from the application of stress in an environment of, for example, high temperature and high humidity is low, the photoelastic constant of the non-birefringent resin material according to the present invention is preferably $-10 \times 10^{-12}$ to $10 \times 10^{-12}$, more preferably $-4 \times 10^{-12}$ to $4 \times 10^{-12}$, even more preferably $-2 \times 10^{-12}$ to $2 \times 10^{-12}$, even more preferably $-1.5 \times 10^{-12}$ to $1.5 \times 10^{-12}$, particularly preferably $-1 \times 10^{-12}$ to $1 \times 10^{-12}$, more particularly preferably $-0.5 \times 10^{-12}$ to $0.5 \times 10^{-12}$, most preferably $-0.3 \times 10^{-12}$ to $0.3 \times 10^{-12}$. When the non-birefringent resin material having a photoelastic constant of $-4 \times 10^{-12}$ to $4 \times 10^{-12}$ is formed into a film and the film is used in a liquid crystal display device, a phase difference variation, a reduction in the contrast of peripheral area of a display screen, and light leakage do not occur.

The non-birefringent resin material according to the present invention has high mechanical strength. The mechanical strength can be evaluated by, for example, tensile elongation at breakage in a tensile test, and the tensile elongation at breakage of the non-birefringent resin material according to the present invention is preferably 10% or more, more preferably 20% or more, even more preferably 30% or more, even more preferably 40% or more, particularly preferably 50% or more, more particularly preferably 60% or more, most preferably 90% or more. The non-birefringent resin material according to the present invention having a tensile elongation at breakage within the above range does not cause a problem such as cracking during molding processing, and is therefore extremely excellent in productivity. Further, when a product using the non-birefringent resin material according to the present invention is actually used, trouble such as cracking does not occur. The occurrence of cracking is particularly correlated with tensile elongation at breakage, and a higher tensile elongation at breakage means higher cracking resistance.

When the non-birefringent resin material according to the present invention is molded into a film, both surfaces of the film may be brought into contact with (sandwiched between) rolls or metal belts, especially rolls or metal belts heated to a temperature around the glass transition temperature of the film, at the same time, if necessary, so that the film has higher surface properties. Further, the film may be subjected to lamination molding or may be modified by biaxial stretching depending on its intended use.

The non-birefringent resin material according to the present invention can be formed into a film even under such high-temperature molding conditions that a T-die film molding machine is used without causing contamination of the molding machine due to scattering of a UV absorber or film defects.

Hereinbelow, as one example of a method for producing the film according to the present invention, a method for producing a film by melt-extrusion molding of the non-birefringent resin material according to the present invention will be described in detail.

It is to be noted that in the following description, a film molded by melt extrusion is referred to as "melt-extruded film" to differentiate it from a film molded by another method such as solution casting.

When the non-birefringent resin material according to the present invention is molded into a film by melt extrusion, the non-birefringent resin material according to the present invention is first supplied to an extruder and melted by heating.

The non-birefringent resin material is preferably subjected to predrying before supplied to the extruder. By performing such predrying, it is possible to prevent foaming of the resin extruded from the extruder.

A method for predrying is not particularly limited, but for example, a raw material (i.e., the non-birefringent resin material according to the present invention) may be predried by a hot air drier or the like after formed into pellets or the like.

Further, the extruder for molding the non-birefringent resin material according to the present invention preferably has one or more devolatilizers for removing volatile matter produced during melting by heating. By providing one or more devolatilizers, it is possible to reduce deterioration of film appearance due to foaming or decomposition/deterioration reaction of the resin.

Further, during melt extrusion for molding the non-birefringent resin material according to the present invention, an inert gas such as nitrogen or helium is preferably supplied to a cylinder of the extruder together with the resin material. By supplying an inert gas, it is possible to reduce the concentration of oxygen in a system to reduce decomposition caused by oxidation degradation, cross-linking, or degradation of appearance or quality such as yellowing.

Then, the non-birefringent resin material melted by heating in the extruder is supplied through a gear pump or a filter to a T-die. By using a gear pump at this time, it is possible to improve uniformity of the amount of the resin to be extruded to reduce a thickness variation. On the other hand, the use of a filter makes it possible to remove foreign matter in the non-birefringent resin material to obtain a film having excellent appearance without defects.

The filter to be used is preferably a stainless steel leaf-disk type filter that can remove foreign matter from a melted polymer, and a filter element to be used is preferably of fiber type, powder type, or complex type thereof. The filter can be preferably used for an extruder or the like for use in pelletization or film formation.

Then, the non-birefringent resin material supplied to the T-die is extruded through the T-die as a sheet-shaped melted resin. The sheet-shaped melted resin is preferably sandwiched between two cooling rolls and then cooled to form a film.

One of the two cooling rolls sandwiching the sheet-shaped melted resin is preferably a rigid metal roll having a smooth surface and the other cooling roll is preferably a flexible roll having an elastic deformable metal elastic external cylinder having a smooth surface.

By cooling the sheet-shaped melted resin sandwiched between such rigid metal roll and flexible roll having a metal elastic external cylinder, it is possible to correct surface microirregularities or die lines to obtain a film having a smooth surface and a thickness variation of 5 μm or less.

It is to be noted that the term "cooling roll" used in this specification includes the meaning of "touch roll" and "cooling roll".

Even when the above-described rigid metal roll and flexible roll are used, there is a case where, when a film to be formed is thin, the surfaces of the cooling rolls come into contact with each other so that the external surfaces of the cooling rolls are damaged or the cooling rolls themselves are broken because both the cooling rolls have a metallic surface.

Therefore, when sandwiched between such two cooling rolls as described above to form a film, the sheet-shaped melted resin is first sandwiched between the two cooling rolls and then cooled to obtain a film.

The film according to the present invention has very high toughness and excellent flexibility and therefore does not need to be stretched to improve strength, which increases productivity due to omission of a stretching process and has a cost advantage. The film according to the present invention has high transparency and therefore can have a thickness of 10 μm or more to achieve high strength. Further, the film according to the present invention exhibits substantially no orientation birefringence even when stretched and has optical isotropy. Further, the film according to the present invention is less likely to thermally shrink during secondary molding such as vacuum molding or during use at high temperature.

The film according to the present invention has the above effects even in an unstretched state, but may be stretched to further improve strength and film thickness accuracy. Further, selection of optimum stretching conditions makes it easy to produce a film that exhibits substantially no birefringence and substantially no increase in haze and has a small thickness variation.

When the film according to the present invention is a stretched film, the stretched film (uniaxially-stretched film or biaxially-stretched film) can be produced by once molding the non-birefringent resin material according to the present invention to form an unstretched film and then by subjecting the unstretched film to uniaxial stretching or biaxial stretching. For example, a sheet-shaped melted resin is sandwiched between the above-described two cooling rolls and then cooled to once obtain an unstretched film having a thickness of 150 μm, and then the film is subjected to vertical and horizontal biaxial stretching to have a thickness of 40 μm.

In this specification, for convenience of description, an unstretched film that is obtained by molding the non-birefringent resin material according to the present invention but is not subjected to stretching is referred to as "raw material film".

When stretched, the raw material film may be continuously subjected to stretching just after molding or may be subjected to stretching after once stored or transferred after molding.

It is to be noted that when stretched just after molding, the raw material film may be stretched very shortly (in some cases, instantaneously) after molding in a film production process or may be stretched some time after once produced.

When the film according to the present invention is a stretched film, the raw material film shall be kept in a film form good enough to be stretched and does not always need to be in a perfect film state.

A method for stretching the raw material film is not particularly limited, and a conventionally-known any stretching method may be used. More specifically, the raw material film may be subjected to, for example, lateral stretching using a tenter, longitudinal stretching using a roll, or sequential biaxial stretching in which such lateral stretching and longitudinal stretching are sequentially performed.

Alternatively, the stretching method may be a simultaneous biaxial stretching method in which lateral stretching and longitudinal stretching are simultaneously performed or a method in which longitudinal stretching using a roll is performed and then lateral stretching using a tenter is performed.

When stretched, the raw material film is preferably once preheated to a temperature higher than a stretching temperature by 0.5 to 5° C., preferably 1 to 3° C. and then cooled to the stretching temperature before stretching.

By preheating the raw material film to a temperature within the above range, it is possible to accurately maintain the thickness of the raw material film or to prevent a resulting stretched film from having low thickness accuracy or a thickness variation. Further, it is possible to prevent the raw material film from adhering to a roll or sagging under its own weight.

On the other hand, if the preheating temperature of the raw material film is too high, an adverse effect, such as adhesion of the raw material film to a roll or sagging of the raw material film under its own weight, tends to occur.

Further, if a difference between the preheating temperature and the stretching temperature of the raw material film is small, the raw material film before stretching tends to be difficult to maintain thickness accuracy or a resulting stretched film tends to have a large thickness variation or low thickness accuracy.

It is to be noted that when the non-birefringent resin material according to the present invention is molded to form a raw material film and the raw material film is stretched, it is difficult to improve thickness accuracy by utilizing a necking phenomenon. Therefore, in the present invention, control of the above-described preheating temperature is important to maintain or improve the thickness accuracy of a resulting film.

The stretching temperature at which the raw material film is stretched is not particularly limited, and may be changed according to mechanical strength, surface properties, and thickness accuracy required for a stretched film to be produced.

In general, when the glass transition temperature of the raw material film determined by a DSC method is defined as Tg, the stretching temperature is preferably in the range of (Tg−30° C.) to (Tg+30° C.), more preferably in the range of (Tg−20° C.) to (Tg+20° C.), and even more preferably in the range of (Tg) to (Tg+20° C.).

When the stretching temperature is within the above range, it is possible to reduce the thickness variation of a resulting stretched film and to improve the mechanical properties of the film such as percentage of elongation, tear propagation strength, and resistance to flexural fatigue. Further, it is possible to prevent the occurrence of trouble such as adhesion of the film to a roll.

On the other hand, if the stretching temperature is higher than the above upper limit, a resulting stretched film tends to have a large thickness variation or the mechanical properties of the film, such as percentage of elongation, tear propagation strength, and resistance to flexural fatigue, tend not to be sufficiently improved. Further, trouble such as adhesion of the film to a roll tends to occur.

If the stretching temperature is lower than the above lower limit, a resulting stretched film tends to have a large haze or, in an extreme case, a problem, such as the occurrence of tears or cracks in the film, tends to occur during the production process.

When the raw material film is stretched, its stretching ratio is not particularly limited, either, and may be determined according to the mechanical strength, surface properties, and thickness accuracy of a stretched film to be produced. In general, depending on the stretching temperature, the stretching ratio is preferably in the range of 1.1 to 3 times, more preferably in the range of 1.3 to 2.5 times, even more preferably in the range of 1.5 to 2.3 times.

When the stretching ratio is within the above range, it is possible to significantly improve the mechanical properties of the film such as elongation percentage, tear propagation strength, and resistance to flexural fatigue. Therefore, it is possible to produce a stretched film that has a thickness variation of 5 μm or less, exhibits substantially no birefringence, and has a haze of 2.0% or less.

If necessary, the film according to the present invention may be used by laminating another film thereon with an adhesive or the like or by forming a coating layer such as a hard coating layer or the like on the surface thereof.

If necessary, the non-birefringent resin material according to the present invention may be blended with a polyglutarimide acrylic resin, a glutaric anhydride acrylic resin, a lactonized acrylic resin, a methacrylic resin, a polyethylene terephthalate resin, a polybutylene terephthalate resin, or the like. A blending method is not particularly limited, and a known method can be used.

If necessary, the non-birefringent resin material according to the present invention may be blended with birefringent inorganic microparticles described in Japanese Patent No. 3648201 or Japanese Patent No. 4336586 or a birefringent low-molecular compound having a molecular weight of 5000 or less, preferably 1000 or less described in Japanese Patent No. 3696649 to adjust orientation birefringence.

Further, the non-birefringent resin material according to the present invention shall contain at least one resin (A) and at least one polymer (B), and one or more other resins may be added thereto without any particular limitation as long as the objects of the present invention can be achieved. Examples of the other resins include the thermoplastic resins mentioned above as examples of the resin (A), multi-layered polymers such as core-shell polymers and graft copolymers, and thermoplastic elastomers such as block polymers.

If necessary, the non-birefringent resin material according to the present invention may contain a known additive or another resin. Examples of the additive include light stabilizers, UV absorbers, heat stabilizers, delustrants, light diffusers, colorants, dyes, pigments, antistatic agents, heat reflecting agents, lubricants, plasticizers, UV absorbers, stabilizers, and fillers.

If necessary, the surface gloss of the film according to the present invention may be reduced by a known method. This can be achieved by, for example, kneading an inorganic filler or cross-linked polymer particles with the non-birefringent resin material. Alternatively, a film obtained from the non-birefringent resin material may be embossed to reduce its surface gloss.

The film according to the present invention may be laminated on a metal or plastic. Examples of a method for laminating the film include lamination molding, wet lamination in which an adhesive is applied onto a metal plate such as a steel plate and then the film is laminated on and bonded to the metal plate by drying, dry lamination, extrusion lamination, and hot-melt lamination.

Examples of a method for laminating the film on a plastic part include insertion molding or laminate injection press molding in which a resin is injected into a mold in which a film is provided and in-mold molding in which a resin is injected into a mold in which a pre-molded film is provided.

An article on which the film according to the present invention is laminated can be used as, for example, substitutes for paint such as car interior materials and car exterior materials, building materials such as window frames, bathroom fitments, wallpapers, and floor materials, daily goods, housings for furniture or electrical equipment, housings for OA equipment such as facsimiles, laptop computers, and copy machines, front panels of liquid crystal displays of terminal equipment such as mobile phones, smartphones, and tablets, and parts of electric or electronic devices.

The film according to the present invention can be used for various purposes listed below for its properties such as heat resistance, transparency, and flexibility. More specifically, the film according to the present invention can be used for interior and exterior of cars, personal computers, mobile devices, solar batteries, and the like; solar battery backsheets; taking lenses for cameras, VTRs, and projectors; finders, filters, prisms, Fresnel lenses, and the like for use in the field of imaging; lenses such as pick-up lenses for optical disc in CD players, DVD players, MD players, and the like for use in the field of lens; optical discs such as CDs, DVDs, and MDs for use in the field of optical recording; films for liquid crystal displays such as light guide plates, diffuser plates, backsheets, reflection sheets, polarizer protective films, polarizing films, transparent resin sheets, phase difference films, light diffusing films, prism sheets, and the like and surface protective films for use in the field of information devices; optical fibers, optical switches, optical connectors, and the like for use in the field of optical communications; car headlights, tail lamp lenses, inner lenses, instrument covers, sunroofs, and the like for use in the field of vehicles; medical devices such as eyeglasses, contact lenses, lenses for endoscopes, and medical supplies requiring sterilization for use in the medical field; road signs, bathroom fitments, floor materials, translucent panels for roads, lenses for double glazing, lighting windows, carports, lenses for lighting, lighting covers, sidings for construction materials, and the like for use in the fields of architecture and construction materials; microwave cooking vessels (dishes); housings for home appliances; toys; sunglasses; and stationary, etc. The film according to the present invention can be used also as a substitute for a molded article using a transfer foil sheet.

A molded article, other than a film, made of the non-birefringent resin material according to the present invention can be used as, for example, lenses such as lenses for common cameras, lenses for video cameras, object lenses, diffraction gratings, holograms, and collimators for laser pickup, fθ lenses for laser printers, cylindrical lenses, condenser lenses or projector lenses for liquid crystal projectors, Fresnel lenses, and lenses for eyeglasses, disc substrates for compact discs (e.g., CDs and CD-ROMs), mini discs (MDs), and DVDs, members for liquid crystal elements such as light guide plates for LCDs, films for LCDs, substrates for LCDs, and adhesives for bonding liquid crystal elements, screens for projectors, optical filters, optical fibers, optical waveguides, prisms, lenses for lighting, car headlights, medical supplies requiring sterilization, microwave cooking vessels, housings for home appliances, toys, and recreation items.

The film according to the present invention can have a thickness of 10 μm or more but 500 μm or less while satisfying an orientation birefringence of $-1.7 \times 10^{-4}$ to $1.7 \times 10^{-4}$, a photoelastic constant of $-4 \times 10^{-12}$ to $4 \times 10^{-12}$, and a tensile elongation at breakage of 10% or more. Particularly, the film according to the present invention is excellent in optical characteristics such as optical homogeneity and transparency. Therefore, the film according to the present invention is particularly suitable for use in known optical applications, such as peripheral materials of liquid crystal displays such as optical isotropic films, polarizer protective films, and transparent conductive films, for its optical characteristics.

The film according to the present invention may be bonded to a polarizer to be used as a polarizing plate. That is, the film according to the present invention may be used as a polarizer protective film of a polarizing plate. The polarizer is not particularly limited and may be any conventionally-known polarizer. A specific example of such a polarizer is iodine-doped stretched polyvinyl alcohol.

If necessary, the film according to the present invention may be subjected to surface treatment. For example, when subjected to surface finishing such as coating or laminated on the surface of another film, the film according to the present invention is preferably subjected to surface treatment. By subjecting the film according to the present invention to such surface treatment, it is possible to improve adhesion between the film according to the present invention and a coating material or another film to be laminated.

It is to be noted that the purpose of surface treatment of the film according to the present invention is not limited to the above purposes. The film according to the present invention may be subjected to surface treatment regardless of its intended use. Such surface treatment is not particularly limited, and examples thereof include corona treatment, plasma treatment, ultraviolet irradiation, and alkali treatment. Among them, corona treatment is preferred.

The thickness of the film according to the present invention is not particularly limited, but is preferably 500 μm or less, more preferably 300 μm or less, particularly preferably 200 μm or less. Further, the thickness of the film according to the present invention is preferably 10 μm or more, more preferably 30 μm or more, even more preferably 50 μm or more, particularly preferably 100 μm or more. The film according to the present invention having a thickness within the above range is advantageous in that the film is less likely to be deformed when subjected to vacuum molding and therefore a deep-drawn portion is less likely to be broken, and can have uniform optical characteristics and excellent transparency. On the other hand, if the thickness of the film exceeds the above upper limit, the film after molding is non-uniformly cooled and therefore tends to have non-uniform optical characteristics. If the thickness of the film is less than the above lower limit, there is a case where the film is difficult to handle.

The film according to the present invention preferably has a haze value of 2.0% or less, more preferably 1.0% or less, even more preferably 0.8% or less, particularly preferably 0.5% or less. When the film according to the present invention has a haze value within the above range, its transparency is sufficiently high and therefore the film is suitable for optics applications, decorative applications, interior applications, or vacuum molding applications requiring transparency.

The film according to the present invention preferably has a total light transmittance of 85% or higher, more preferably 88% or higher. When the film according to the present invention has a total light transmittance within the above range, its transparency is sufficiently high and therefore the film is suitable for optics applications, decorative applications, interior applications, or vacuum molding application requiring transparency.

The film according to the present invention preferably has a glass transition temperature of 100° C. or higher, more preferably 115° C. or higher, even more preferably 120° C. or higher, even more preferably 124° C. or higher. When having a glass transition temperature within the above range, the film according to the present invention can have sufficiently high heat resistance.

The film according to the preset invention preferably has a tensile elongation at breakage of 10% or more, more preferably 20% or more, even more preferably 30% or more, even more preferably 40% or more, particularly preferably 50% or more, more particularly preferably 60% or more, most preferably 90% or more. When having a tensile elongation at breakage within the above range, the film according to the present invention is less likely to be cracked when cut out with a Thomson blade or a cutter blade (trimming property) and is less likely to be broken when rolled up or when the surface thereof is subjected to after-processing such as coating, vapor deposition, sputtering, or bonding to a protective film. Further, the film has high crack resistance against bending, and therefore trouble such as cracking does not occur not only when the film is subjected to after-processing but also when the film is practically used as a product. The occurrence of cracking is particularly correlated with tensile elongation at breakage, and a higher tensile elongation at breakage means higher crack resistance.

As described above, the film according to the present invention can be used as an optical film. Particularly, when used as a polarizer protective film, the film according to the present invention preferably has low optical anisotropy. Particularly, the optical anisotropy of the film is preferably low not only in its in-plane direction (length and width directions) but also in its thickness direction. In other words, both the in-plane phase difference and the absolute value of the thickness-direction phase difference of the film are preferably small. More specifically, the in-plane phase difference is preferably 10 nm or less, more preferably 6 nm or less, even more preferably 5 nm or less, even more preferably 3 nm or less. The absolute value of the thickness-direction phase difference is preferably 50 nm or less, more preferably 20 nm or less, even more preferably 10 nm or less, most preferably 5 nm or less. The film having such a phase difference can be preferably used as a polarizer protective film of a polarizing plate in a liquid crystal display device. On the other hand, if the film having an in-plane phase difference exceeding 10 nm or a thickness-direction phase difference exceeding 50 nm is used as a polarizer protective film of a polarizing plate in a liquid crystal display device, there is a case where a problem such as a reduction in the contrast of the liquid crystal display device occurs.

Phase difference is an index value calculated based on birefringence, and in-plan phase difference (Re) and thickness-direction phase difference (Rth) can be calculated by the following formulas, respectively. In the case of an ideal film that is completely optically isotropic in three dimensional directions, its in-plane phase difference Re and thickness-direction phase difference Rth are both 0.

$$Re=(nx-ny) \times d$$

$$Rth=((nx+ny)/2-nz) \times d$$

In the above formulas, nx, ny, and nz represent a refractive index in an X-axis direction that is an in-plane stretching direction (orientation direction of polymer chains), a refractive index in a Y-axis direction that is a direction perpendicular to the X axis, and a refractive index in a Z-axis direction that is a film thickness direction, respectively, d represents a film thickness, and nx−ny represents orientation birefringence. It is to be noted that in the case of a melt-extruded film, MD direction corresponds to the X axis, and in the case of a stretched film, a stretching direction corresponds to the X axis.

The value of orientation birefringence of a molded body made of the non-birefringent resin material according to the present invention is preferably $-15 \times 10^{-4}$ to $15 \times 10^{-4}$, more preferably $-10 \times 10^{-4}$ to $10 \times 10^{-4}$, even more preferably $-5 \times 10^{-4}$ to $5 \times 10^{-4}$, even more preferably $-1.6 \times 10^{-4}$ to $1.6 \times 10^{-4}$, particularly preferably $-1 \times 10^{-4}$ to $1 \times 10^{-4}$, more particularly preferably $-0.5 \times 10^{-4}$ to $0.5 \times 10^{-4}$, most preferably $-0.2 \times 10^{-4}$ to $0.2 \times 10^{-4}$. When the orientation birefringence of the molded body is within the above range, the molded body does not exhibit birefringence resulting from molding processing and therefore can be practically used without problem.

The value of orientation birefringence of a film made of the non-birefringent resin material according to the present invention is preferably $-1.7 \times 10^{-4}$ to $1.7 \times 10^{-4}$, more preferably $-1.6 \times 10^{-4}$ to $1.6 \times 10^{-4}$, even more preferably $-1.5 \times 10^{-4}$ to $1.5 \times 10^{-4}$, even more preferably $-1.0 \times 10^{-4}$ to $1.0 \times 10^{-4}$, particularly preferably $-0.5 \times 10^{-4}$ to $0.5 \times 10^{-4}$, most preferably $-0.2 \times 10^{-4}$ to $0.2 \times 10^{-4}$. When the orientation birefringence of the film is within the above range, the film does not exhibit birefringence resulting from molding processing and therefore can have stable optical characteristics. Further, the film is very suitable as an optical film for use in liquid crystal displays and the like.

A molded body made of the non-birefringent resin material according to the present invention preferably has a photoelastic constant of $-10 \times 10^{-12}$ to $10 \times 10^{-12}$, more preferably $-4 \times 10^{-12}$ to $4 \times 10^{-12}$, even more preferably $-2 \times 10^{-12}$ to $2 \times 10^{-12}$, even more preferably $-1 \times 10^{-12}$ to $1 \times 10^{-12}$, even more preferably $-0.5 \times 10^{-12}$ to $0.5 \times 10^{-12}$, most preferably $-0.3 \times 10^{-12}$ to $0.3 \times 10^{-12}$. When the photoelastic constant of the molded body is within the above range, the molded body exhibits only small birefringence even when stress is applied thereto in an environment of, for example, high temperature and high humidity, and therefore can be practically used without problem.

A film made of the non-birefringent resin material according to the present invention preferably has a photoelastic constant of $-4 \times 10^{-12}$ $Pa^{-1}$ to $4 \times 10^{-12}$ $Pa^{-1}$, more preferably $-1.5 \times 10^{-12}$ $Pa^{-1}$ to $1.5 \times 10^{-12}$ $Pa^{-1}$, even more preferably $-1.0 \times 10^{-12}$ $Pa^{-1}$ to $1.0 \times 10^{-12}$ $Pa^{-1}$, even more preferably $-0.5 \times 10^{-12}$ $Pa^{-1}$ to $0.5 \times 10^{-12}$ $Pa^{-1}$, most preferably $-0.3 \times 10^{-12}$ $Pa^{-1}$ to $0.3 \times 10^{-12}$ $Pa^{-1}$. When the film having a photoelastic constant within the above range is used in a liquid crystal display device, the molded body exhibits only small birefringence even when stress is applied thereto in an environment of, for example, high temperature and high humidity, and therefore a phase difference variation, a reduction in the contrast of peripheral area of a display screen, and light leakage do not occur.

EXAMPLES

Hereinbelow, the present invention will be described more specifically with reference to examples, but is not limited to these examples. In the following description, "part(s)" and "%" represent "part(s) by weight" and "wt %", respectively unless otherwise specified.

(Volume-Average Particle Diameter to (Meth)Acrylic Cross-Linked Polymer Layer of Graft Copolymer)

The volume-average particle diameter to the (meth) acrylic cross-linked polymer layer of a graft copolymer (volume-average particle diameter of acrylic rubber particles) was measured using an acrylic rubber particle latex. The measurement of the volume-average particle diameter (μm) was performed using, as a measuring instrument, MICROTRAC UPA150 manufactured by NIKKISO CO., LTD.

(Polymerization Conversion Ratio)

First, part of an obtained slurry was sampled and accurately weighed, dried in a hot-air drier at 120° C. for 1 hour, and then accurately weighed to determine the weight of solid matter. Then, the ratio between the results of accurate measurement before and after drying was determined as the solid content of the slurry. Finally, a polymerization conversion ratio was calculated by the following formula using the solid content. It is to be noted that in this calculation formula, a chain transfer agent was regarded as a monomer charged.

Polymerization conversion ratio (%)=[(total weight of raw materials charged×solid content−total weight of raw materials other than water and monomers)/weight of monomers charged]×100

(Graft Ratio)

Two grams of the polymer (B) obtained was dissolved in 50 mL of methyl ethyl ketone, and the solution was separated into insoluble matter and soluble matter by centrifugation using a centrifugal separator (CP60E manufactured by Hitachi Koki Co., Ltd.) at 30000 rpm for 1 hour (three sets of centrifugation were performed in total). The thus obtained insoluble matter was used to calculate a graft ratio by the following formula.

Graft ratio (%)={(weight of methyl ethyl ketone insoluble matter−weight of cross-linked polymer layer)/weight of cross-linked polymer layer}×100

It is to be noted that the weight of a cross-linked polymer layer refers to the weight of monofunctional monomers charged and constituting the cross-linked polymer layer.

(Imidization Ratio)

An imidization ratio was calculated in the following manner using IR. Pellets of a product were dissolved in methylene chloride to obtain a solution, and the IR spectrum of the solution was measured at room temperature using TravelIR manufactured by SensIR Technologies. From the obtained IR spectrum, the absorption intensity of ester carbonyl groups at 1720 $cm^{-1}$ (Absester) and the absorption intensity of imide carbonyl groups at 1660 $cm^{-1}$ (Absimide) were determined, and the ratio between them was determined as an imidization ratio (Im % (IR)). The term "imidization ratio" used herein refers to the ratio of imide carbonyl groups to the total carbonyl groups.

(Glutarimide Unit Content)

A resin was subjected to $^1$H-NMR analysis using $^1$H-NMR BRUKER AvanceIII (400 MHz) to determine the amount of each monomer unit (mol %), such as a glutarimide unit or an ester unit, contained in the resin, and the monomer unit content (mol %) was converted to a monomer unit content (wt %) using the molecular weight of each monomer unit.

(Acid Value)

An obtained glutarimide acrylic resin of 0.3 g was dissolved in a mixed solvent of 37.5 mL of methylene chloride and 37.5 mL of methanol. Two drops of a phenolphthalein ethanol solution were added, and then 5 mL of a 0.1N aqueous sodium hydroxide solution was added. Then, the excess base was titrated with 0.1N hydrochloric acid, and a difference between the amount of the base added and the amount of hydrochloric acid used before neutralization was accomplished expressed in milliequivalent was determined as an acid value.

(Refractive Index)

Each composition was processed into a sheet, and the refractive index (nD) of the sheet was measured at the sodium D-line wavelength in accordance with JIS K7142 using an Abbe refractometer 2T manufactured by ATAGO CO., LTD.

(Glass Transition Temperature)

The temperature of a sample was once increased to 200° C. at a rate of 25° C./min by a differential scanning calorimetry (DSC) SSC-5200 manufactured by Seiko Instruments Inc., held at 200° C. for 10 minutes, and decreased to 50° C. at a rate of 25° C./min to preliminarily adjust the temperature of the sample, and then the DSC curve of the sample was measured while the temperature of the sample was increased to 200° C. at a temperature rise rate of 10° C./min. The integral of the obtained DSC curve (DDSC) was determined, and the glass transition temperature of the sample was determined from its maximum point.

(Total Light Transmittance and Haze Value)

The total light transmittance and haze value of a film were measured by a method specified in JIS K7105 using NDH-300A manufactured by NIPPON DENSHOKU INDUSTRIES CO., LTD.

(Film Thickness)

The film thickness of a film was measured using a digimatic indicator manufactured by Mitutoyo Corporation.

(Formation of Uniaxially-Stretched Film and Measurement of Orientation Birefringence)

A 25 mm×90 mm test specimen was cut out from an unstretched original film having a thickness of 125 µm (so that its longitudinal direction was parallel to MD), both the short sides of the test specimen were held while the test specimen was maintained at a temperature higher by 30° C. than its glass transition temperature for 2 minutes, and the test specimen was uniaxially stretched twice (also referred to as "stretched 100%") at a rate of 200 mm/min in the longitudinal direction (at this time, both the long sides of the test specimen were not fixed). Thereafter, the thus obtained film was cooled to 23° C., and a sample was taken from the central portion of the film to measure birefringence (orientation birefringence) with the use of an automatic double refraction meter (KOBRA-WR manufactured by Oji Scientific Instruments) at a temperature of 23±2° C., a humidity of 50±5%, a wavelength of 590 nm, and an incidence angle of 0°. At the same time, in-plane phase difference Re and thickness-direction phase difference Rth (incidence angle: 40° C.) were also measured (measurement of in-plane phase difference Re and thickness-direction phase difference Rth will be described in detail later).

It is to be noted that formation of a uniaxially-stretched film of the polymer (B) itself and measurement of the orientation birefringence of the film were performed in the following manner: only the polymer (B) was pressed at 190° C. to form a pressed plate having a thickness of 500 µm, a 25 mm×90 mm test specimen was cut out from the central portion of the obtained pressed plate, and measurement of orientation birefringence was performed in the same manner as described above.

In the case of the resin (A), an unstretched original film having a thickness of 125 µm was produced in the same manner as in Example 1, and measurement of orientation birefringence was performed in the same manner as described above.

(Orientation Birefringence of Original Film)

A 40 mm×40 mm test specimen was cut out from an unstretched original film (thickness: 125 µm), and the orientation birefringence of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re and the thickness-direction phase difference Rth (incidence angle: 40°) of the test specimen were also measured (measurement of in-plane phase difference Re and thickness-direction phase difference Rth will be described in detail later).

(In-Plane Phase Difference Re and Thickness-Direction Phase Difference Rth)

A 40 mm×40 mm test specimen was cut out from a film having a thickness of 125 µm, and the in-plane phase difference Re of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°.

From the thickness d of the test specimen measured using a digimatic indicator (manufactured by Mitutoyo Corporation), the refractive index n measured using an Abbe refractometer (3T manufactured by ATAGO CO., LTD.), and the in-plane phase difference Re and the phase difference in a direction inclined at 40° measured using the automatic double refraction meter at a wavelength of 590 nm, three-dimensional refractive indexes nx, ny, and nz were determined to calculate a thickness-direction phase difference, $Rth=((nx+ny)/2-nz)\times d$. It is to be noted that the measured value was multiplied by 100 (μm)/film thickness (μm) to be converted to a value per 100 μm thickness, and the thus obtained value is shown in Table 3.

(Photoelastic Constant)

A strip-shaped test specimen of 15 mm×90 mm was cut out (so that its longitudinal direction was parallel to TD) from a film having a thickness of 125 μm. The photoelastic constant of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. The measurement was performed in the following manner: one of the long sides of the film was fixed and birefringence was measured while a load applied to the other long side was increased from 0 kgf to 4 kgf by 0.5-kgf increments, and from the obtained results, the magnitude of a change in birefringence per unit stress was determined.

It is to be noted that the photoelastic constant of the polymer (B) itself was measured in the following manner: only the polymer (B) was pressed at 190° C. to prepare a pressed plate having a thickness of 500 μm, a 15 mm×90 mm test specimen was cut out from the central portion of the obtained pressed plate, and the photoelastic constant of the test specimen was measured in the same manner as described above.

In the case of the resin (A), an unstretched original film having a thickness of 125 μm was produced in the same manner as in Example 1, and measurement of photoelastic constant was performed in the same manner as described above.

(Evaluation of Foreign Matter)

Samples having a total area of 1 m² were cut out from an obtained film, and the total number of foreign substances having a size of 20 μm or more was counted by, for example, observation with a microscope and evaluated according to the following criteria:

○: less than 100 per m² x: 100 or more per m².

(Evaluation of Mechanical Strength)

Mechanical strength was evaluated in terms of trimming property and tensile elongation at breakage as an indicator of crack resistance (tensile elongation: %).

Evaluation of Trimming Property

A film having a thickness of 125 μm was cut using a cutter, and the cut surface of the film was observed to evaluate the trimming property of the film according to the following criteria:

○: no occurrence of cracking was observed in the cut surface;

Δ: occurrence of cracking was observed in the cut surface; and x: occurrence of cracking was significantly observed in the cut surface.

Tensile Elongation at Breakage

A film having a thickness of 125 μm was used. A tensile test was performed in accordance with ISO527-3 (JIS K 7127) using a type 5 test specimen at a test rate in MD of 200 mm/min, a temperature of 23±2° C., and a humidity of 50±5%.

(Heat Stability)

The melt viscosity of an obtained resin composition was measured under conditions specified in JIS K7199 (die temperature: 260° C., shear rate: 24 sec$^{-1}$, capillary die diameter: 1 mm, dwell time: 1 hour), and the rate of reduction in melt viscosity was calculated by the following calculation formula from the melt viscosity at a dwell time of 10 minutes and the melt viscosity at a dwell time of 1 hour, and was regarded as an indicator of heat stability. After the test, a strand was observed to determine the presence or absence of foaming due to thermal decomposition of the resin.

Ratio of reduction in melt viscosity=(melt viscosity at a dwell time of 10 minutes−melt viscosity at a dwell time of 1 hour)/(melt viscosity at a dwell time of 10 minutes)×100(%)

The heat stability was evaluated according to the following criteria:

○: the ratio of reduction in melt viscosity was less than 20% and no foaming was observed in the strand; and x: the ratio of reduction in melt viscosity was 20% or higher and foaming was observed in the strand.

The melt viscosity was evaluated according to the following criteria:

○: the melt viscosity was low and therefore the resin composition could be extruded without difficulty; and x: the melt viscosity was high and therefore the filter was damaged and desired filtration accuracy was not achieved.

Production Example 1

Production of Glutarimide Acrylic Resin (A1)

A glutarimide acrylic resin (A1) was produced using polymethylmethacrylate as a raw material resin and monomethylamine as an imidization agent.

In this production, a tandem-type reactive extruder was used, in which two extrusion reactors were connected in series.

The tandem-type reactive extruder had a first extruder and a second extruder, and both the extruders were intermeshing co-rotating twin screw extruders having a diameter of 75 mm and an L/D ratio (ratio of length (L) to diameter (D) of extruder) of 74. The raw material resin was supplied through the raw material supply port of the first extruder using a loss-in-weight feeder (manufactured by KUBOTA Corporation).

The pressure in each of the vents of the first and second extruders was reduced to −0.095 MPa. Further, the first extruder was connected to the second extruder through a pipe having a diameter of 38 mm and a length of 2 m, and a constant flow pressure valve was used as a system for controlling the pressure in a part connecting the resin discharge port of the first extruder to the raw material supply port of the second extruder.

After the resin (strand) discharged from the second extruder was cooled on a cooling conveyer and cut into pellets by a pelletizer. In order to adjust the pressure in the part connecting the resin discharge port of the first extruder and the raw material supply port of the second extruder or to detect unstable extrusion, resin pressure meters were provided at the discharge port of the first extruder, the center of the part connecting the first and second extruders, and the discharge port of the second extruder.

In the first extruder, an imide resin intermediate 1 was produced using a polymethylmethacrylate resin (Mw: 105000) as a raw material resin and monomethylamine as an imidization agent. At this time, the temperature of maximum temperature portion of the extruder was 280° C., the screw rotation speed of the extruder was 55 rpm, the supply rate of the raw material resin was 150 kg/hr, and the amount of monomethylamine added was 2.0 parts per 100 parts of the raw material resin. The constant flow pressure valve was provided just before the raw material supply port of the second extruder to adjust the pressure in the monomethylamine injection portion of the first extruder to 8 MPa.

In the second extruder, the remaining imidization agent and a by-product were devolatilized through a rear vent and a vacuum vent, and then dimethyl carbonate was added as an esterification agent to produce an imide resin intermediate 2. At this time, the temperature of each barrel of the extruder was 260° C., the screw rotation speed of the extruder was 55 rpm, and the amount of dimethyl carbonate added was 3.2 parts per 100 parts of the raw material resin. Further, the esterification agent was removed through a vent, and then an obtained glutarimide acrylic resin (A1) was extruded through a strand die, cooled in a water tank, and pelletized by a pelletizer.

The obtained glutarimide acrylic resin (A1) is an acrylic resin (A) obtained by copolymerization of a glutarimide unit represented by the general formula (1) and a (meth)acrylate unit represented by the general formula (2).

The imidization ratio, glutarimide unit content, acid value, glass transition temperature, and refractive index of the glutarimide acrylic resin (A1) were measured by the above-described methods. As a result, the imidization ratio was 13%, the glutarimide unit content was 7 wt %, the acid value was 0.4 mmol/g, the glass transition temperature was 130° C., and the refractive index was 1.50. The glutarimide acrylic resin (A1) had a negative photoelastic constant.

Production Example 2

Production of Graft Copolymer (B1)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.45 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 46.391 parts of a raw material mixture of acrylic rubber particles (B-1) shown in Table 2 was continuously added for 225 minutes. After 50 minutes from the start of the addition of (B-1), 0.2 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) was added to the polymerization apparatus. After the addition, polymerization was further continued for 0.5 hr to obtain acrylic rubber particles (polymer (B-1)). The polymerization conversion ratio was 99.7%.

Then, the temperature in the polymerization apparatus was adjusted to 60° C., and 0.2 part of sodium formaldehyde sulfoxylate was fed into the polymerization apparatus. Then, 55.554 parts of a raw material mixture of a hard polymer layer (B-2) shown in Table 2 was continuously added for 210 minutes and polymerization was further continued for 1 hour to obtain a graft copolymer latex. The polymerization conversion ratio was 100.0%. The obtained latex was salted out and coagulated with magnesium sulfate, washed with water, and dried to obtain a white powder of a graft copolymer (B1).

The average particle diameter of rubber particles (polymer B-1) of the graft copolymer (B1) was 73 nm. The graft ratio of the graft copolymer (B1) was 85%.

Production Example 3

Production of Graft Copolymer (B2)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.491 parts of a raw material mixture of acrylic rubber particles (B-1) shown in Table 2 was continuously added for 225 minutes. After 20, 40, and 60 minutes from the start of the addition of (B-1), 0.2 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) was added each time to the polymerization apparatus. After the addition, polymerization was further continued for 0.5 hr to obtain acrylic rubber particles (polymer (B-1)). The polymerization conversion ratio was 98.6%.

Then, the temperature in the polymerization apparatus was adjusted to 60° C., and 0.2 part of sodium formaldehyde sulfoxylate was fed into the polymerization apparatus. Then, 55.554 parts of a raw material mixture of a hard polymer layer (B-2) shown in Table 2 was continuously added for 210 minutes and polymerization was further continued for 1 hour to obtain a graft copolymer latex. The polymerization conversion ratio was 100.0%. The obtained latex was salted out and coagulated with magnesium sulfate, washed with water, and dried to obtain a white powder of a graft copolymer (B2).

The average particle diameter of rubber particles (polymer B-1) of the graft copolymer (B2) was 121 nm. The graft ratio of the graft copolymer (B2) was 56%.

Production Example 4

Production of Graft Copolymer (B3)

Polymerization was performed in the same manner as in Production Example 2 using a raw material mixture of acrylic rubber particles (B-1) with a composition shown in Table 2 and a raw material mixture of a hard polymer layer (B-2) with a composition shown in Table 2. The thus obtained latex was coagulated, washed with water, and dried to obtain a white powder of a graft copolymer (B3).

The average particle diameter of rubber particles (polymer B-1) of the graft copolymer (B3) was 72 nm. The graft ratio of the graft copolymer (B3) was 87%.

Production Example 5

Production of Graft Copolymer (B4)

The following materials were fed into a polymerization apparatus having a capacity of 8 liters and equipped with a stirrer.

| | |
|---|---|
| Deionized water | 200 parts |
| Sodium dioctylsulfosuccinate | 0.58 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 46.391 parts of a raw material mixture of acrylic rubber particles (B-1) shown in Table 2 was continuously added for 225 minutes. After the addition, polymerization was further continued for 0.5 hr to obtain acrylic rubber particles (polymer (B-1)). The polymerization conversion ratio was 99.7%.

Then, the temperature in the polymerization apparatus was adjusted to 60° C., and 0.2 part of sodium formaldehyde sulfoxylate and 0.2 part of sodium dioctylsulfosuccinate were fed into the polymerization apparatus. Then, 55.554 parts of a raw material mixture of a hard polymer layer (B-2) shown in Table 2 was continuously added for 210 minutes and polymerization was further continued for 1 hour to obtain a graft copolymer latex. The polymerization conversion ratio was 100.0%. The obtained latex was salted out and coagulated with calcium chloride, washed with water, and dried to obtain a white powder of a graft copolymer (B4).

The average particle diameter of rubber particles (polymer B-1) of the graft copolymer (B4) was 72 nm. The graft ratio of the graft copolymer (B4) was 87%.

Production Example 6

Production of Graft Copolymer (B5)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (B-1) shown in Table 2 was continuously added for 135 minutes. After 12, 24, and 36 minutes from the start of the addition of (B-1), 0.2 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) was added each time to the polymerization apparatus. After the addition, polymerization was further continued for 0.5 hr to obtain acrylic rubber particles (polymer (B-1)). The polymerization conversion ratio was 99.4%.

Then, the temperature in the polymerization apparatus was adjusted to 60° C., and 0.2 part of sodium formaldehyde sulfoxylate was fed into the polymerization apparatus. Then, 55.254 parts of a raw material mixture of a hard polymer layer (B-2) shown in Table 2 was continuously added for 165 minutes and polymerization was further continued for 1 hour to obtain a graft copolymer latex. The polymerization conversion ratio was 100.0%. The obtained latex was salted out and coagulated with magnesium sulfate, washed with water, and dried to obtain a white powder of a graft copolymer (B5).

The average particle diameter of rubber particles (polymer B-1) of the graft copolymer (B5) was 133 nm. The graft ratio of the graft copolymer (B5) was 77%.

Production Example 7

Production of Graft Copolymer (B6)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (B-1) shown in Table 2 was continuously added for 135 minutes. After 12, 37, 62, and 87 minutes from the start of the addition of (B-1), 0.21, 0.21, 0.21, and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) were added to the polymerization apparatus, respectively. After the addition, polymerization was further continued for 1 hr to obtain acrylic rubber particles (polymer (B-1)). The polymerization conversion ratio was 97.8%.

Then, the temperature in the polymerization apparatus was adjusted to 60° C., and 0.11 part of sodium polyoxyethylene lauryl ether phosphate and 0.2 part of sodium formaldehyde sulfoxylate were fed into the polymerization apparatus. Then, 55.254 parts of a raw material mixture of a hard polymer layer (B-2) shown in Table 2 was continuously added for 165 minutes and polymerization was further continued for 1 hour to obtain a graft copolymer latex. The polymerization conversion ratio was 97.2%. The obtained latex was salted out and coagulated with magnesium sulfate, washed with water, and dried to obtain a white powder of a graft copolymer (B6).

The average particle diameter of rubber particles (polymer B-1) of the graft copolymer (B6) was 117 nm. The graft ratio of the graft copolymer (B6) was 69%.

Production Example 8

Production of Graft Copolymer (B7)

The following materials were fed into a polymerization apparatus having a capacity of 8 liters and equipped with a stirrer.

ethylene lauryl ether phosphate and 0.2 part of sodium formaldehyde sulfoxylate were fed into the polymerization apparatus. Then, 55.254 parts of a raw material mixture of a hard polymer layer (B-2) shown in Table 2 was continuously added for 165 minutes and polymerization was further continued for 1 hour to obtain a graft copolymer latex. The polymerization conversion ratio was 99.4%. The obtained latex was salted out and coagulated with magnesium sulfate, washed with water, and dried to obtain a white powder of a graft copolymer (B7).

The average particle diameter of rubber particles (polymer B-1) of the graft copolymer (B7) was 118 nm. The graft ratio of the graft copolymer (B7) was 85%.

TABLE 2

| | Polymers (B) | B1 | B2 | B3 | B4 | B5 | B6 | B7 |
|---|---|---|---|---|---|---|---|---|
| Acrylic cross-linked polymer layer (acrylic rubber particles) (B-1) | Monofunctional monomer content of (B) (parts) | 45 | 45 | 45 | 45 | 45 | 45 | 45 |
| | Butyl acrylate (%) | 90 | 90 | 90 | 90 | 90 | 90 | 90 |
| | Methyl methacrylate (%) | 10 | 10 | 10 | 10 | 10 | 10 | 10 |
| | Allyl methacrylate (part(s)) | 1.35 | 0.45 | 1.35 | 1.35 | 0.225 | 0.225 | 0.225 |
| | Cumene hydroperoxide (part) | 0.041 | 0.041 | 0.041 | 0.041 | 0.041 | 0.041 | 0.041 |
| | Volume-average particle diameter of (B-1) (nm) | 73 | 121 | 72 | 72 | 133 | 117 | 118 |
| Hard polymer layer (B-2) | Monofunctional monomer content of (B) (parts) | 55 | 55 | 55 | 55 | 55 | 55 | 55 |
| | Methyl methacrylate (%) | 57.8 | 57.8 | 96 | 96 | 57.8 | 57.8 | 48 |
| | Butyl acrylate (%) | 4 | 4 | 4 | 4 | 4 | 4 | 4 |
| | Benzyl methacrylate (%) | 38.2 | 38.2 | 0 | 0 | 38.2 | | |
| | Dicyclopentanyl methacrylate (%) | | | | | | | 48 |
| | Phenoxyethyl methacrylate (%) | | | | | | 38.2 | |
| | t-dodecyl mercaptane (part) | 0.3 | 0.3 | 0.3 | 0.3 | 0 | 0 | 0 |
| | Cumene perhydroxide (part) | 0.254 | 0.254 | 0.254 | 0.254 | 0.254 | 0.254 | 0.254 |
| Sign of birefringence of polymer (B) itself | Orientation birefringence | + | + | − | − | + | + | − |
| | Photoelastic constant | + | + | − | − | + | + | + |

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (B-1) shown in Table 2 was continuously added for 135 minutes. After 12, 37, 62, and 87 minutes from the start of the addition of (B-1), 0.21, 0.21, 0.21, and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) were added to the polymerization apparatus, respectively. After the addition, polymerization was further continued for 1 hr to obtain acrylic rubber particles (polymer (B-1)). The polymerization conversion ratio was 99.0%.

Then, the temperature in the polymerization apparatus was adjusted to 60° C., and 0.11 part of sodium polyoxy- (Description of Resins (A))

A2: Methyl methacrylate-methacrylic acid copolymer Altuglas HT-121 (Arkema Inc.) with a negative (−) photoelastic constant A3: Maleic anhydride-styrene-methyl methacrylate copolymer PLEXIGLAS hw55 (EVONIK INDUSTRIES) with a negative (−) photoelastic constant Examples 1 to 8, Comparative Examples 1 to 3

A mixture of the acrylic resin (A) and the polymer (B) shown in Table 3 was supplied at a rate of 10 kg/hr to a single screw extruder having a full-flight screw with a diameter of 40 mm. The preset temperature of temperature control zone of the extruder was 255° C. and the screw rotation speed of the extruder was 52 rpm. The resin extruded as a strand through a die provided at the outlet of the extruder was cooled in a water tank and pelletized by a pelletizer to obtain pellets.

The obtained pellets were supplied at a rate of 10 kg/hr to a single screw extruder equipped with a leaf disk filter with a pore size of 5 μm and connected to a T-die at the outlet thereof and melt-extruded to obtain a film having a thickness shown in Table 3. The preset temperature of temperature control zone of the extruder was 260° C. and the screw rotation speed of the extruder was 20 rpm. Various physical properties of the film were evaluated.

TABLE 3

| | | | Examples | | | | | |
|---|---|---|---|---|---|---|---|---|
| | | | 1 | 2 | 3 | 4 | 5 | 6 |
| | Resin (A) | Type | A1 | A1 | A1 | A1 | A1 | A2 |
| | | (parts) | 53 | 53 | 53 | 53 | 53 | 43.8 |
| | Polymers (B) | Type | B1 | B2 | B5 | B6 | B7 | B5 |
| | | (parts) | 47 | 47 | 47 | 47 | 47 | 56.2 |
| Film physical properties | Film thickness | (µm) | 125 | 125 | 125 | 125 | 125 | 125 |
| | Glass transition temperature | (° C.) | 121 | 120 | 121 | 124 | 125 | 129 |
| | Total light transmittance | (%) | 92.4 | 92.1 | 92.1 | 92.0 | 91.5 | 92.2 |
| | Haze value | (%) | 0.24 | 0.36 | 0.62 | 0.30 | 1.70 | 0.80 |
| | Mechanical strength | Evaluation of trimming property | Δ | ○ | ○ | ○ | ○ | ○ |
| | | Tensile elongation at breakage (%) | 45 | 72 | 114 | 76 | 111 | 96 |
| | Foreign matter | | ○ | ○ | ○ | ○ | ○ | ○ |
| | Heat stability | | ○ | ○ | ○ | ○ | ○ | ○ |
| | Melt viscosity | | ○ | ○ | ○ | ○ | ○ | ○ |
| | Unstretched | Photoelastic constant (Pa$^{-1}$) (×10$^{-12}$) | 0.02 | 0.35 | −0.09 | 0.31 | −3.69 | 0.34 |
| | | Orientation birefringence (×10$^{-4}$) | ±0.04 | −0.13 | ±0.07 | −0.04 | −0.04 | −0.09 |
| | | Re (per 100 µm) nm | ±0.4 | −1.3 | ±0.7 | −0.4 | −0.4 | −0.9 |
| | | Rth (per 100 µm) nm | −0.4 | −3.1 | −1.6 | 0.3 | −0.5 | −1.7 |
| | Stretched twice | Orientation birefringence (×10$^{-4}$) | ±0.07 | 0.12 | 0.33 | 0.38 | −0.74 | −0.31 |
| | | Re (per 100 µm) nm | ±0.7 | 1.2 | 3.3 | 3.8 | −7.4 | −3.1 |
| | | Rth (per 100 µm) nm | −0.8 | −0.3 | 1.1 | 0.5 | −5.8 | −2.2 |

| | | | Examples | | Comparative Examples | | |
|---|---|---|---|---|---|---|---|
| | | | 7 | 8 | 1 | 2 | 3 |
| | Resin (A) | Type | A3 | A3 | A1 | A1 | A1 |
| | | (parts) | 63.8 | 44.8 | 53 | 53 | 100 |
| | Polymers (B) | Type | B5 | B5 | B3 | B4 | — |
| | | (parts) | 36.2 | 55.2 | 47 | 47 | — |
| Film physical properties | Film thickness | (µm) | 125 | 125 | 125 | 125 | 125 |
| | Glass transition temperature | (° C.) | 128 | 128 | 123 | 120 | 125 |
| | Total light transmittance | (%) | 89.9 | 89.9 | 92.2 | 92.3 | 92.4 |
| | Haze value | (%) | 2.50 | 4.50 | 0.44 | 0.39 | 0.25 |
| | Mechanical strength | Evaluation of trimming property | Δ | ○ | Δ | Δ | X |
| | | Tensile elongation at breakage (%) | 49 | 66 | 51 | 51 | 5 |
| | Foreign matter | | ○ | ○ | X | X Foaming and many die lines were observed. | ○ |
| | Heat stability | | ○ | ○ | ○ | X | ○ |
| | Melt viscosity | | ○ | ○ | X | X | ○ |
| | Unstretched | Photoelastic constant (Pa$^{-1}$) (×10$^{-12}$) | −0.37 | 1.56 | −4.86 | −4.88 | −4.38 |
| | | Orientation birefringence (×10$^{-4}$) | −0.10 | −0.07 | −0.05 | ±0.05 | ±0.04 |
| | | Re (per 100 µm) nm | −1.0 | −0.7 | −0.5 | ±0.5 | ±0.4 |
| | | Rth (per 100 µm) nm | −3.0 | −0.3 | −1.2 | −2.1 | −0.9 |
| | Stretched twice | Orientation birefringence (×10$^{-4}$) | −1.6 | −0.95 | −0.56 | −0.67 | 0.05 |
| | | Re (per 100 µm) nm | −16.6 | −9.5 | −5.6 | −6.7 | 0.5 |
| | | Rth (per 100 µm) nm | −5.7 | −2.7 | −2.2 | −4.1 | 0.5 |

* The symbol "±" means that the sign could not be identified.

As shown in Table 3, Examples 1 and 7 have high heat resistance and high transparency and are also excellent in mechanical strength such as trimming property. Further, the films have low orientation birefringence, and hardly exhibit orientation birefringence even when stretched. In addition, the films have a very small photoelastic constant and hardly exhibit birefringence even when stress is applied thereto. That is, the films have very low optical anisotropy. Further, the compositions have high heat stability and low melt viscosity, and therefore can be filtered with a filter having a small pore size of, for example, 5 µm on molding, which makes it possible to obtain a film having no foreign substances such as fish-eyes. As can be seen from Table 3, Examples 2 to 6 and 8 can also obtain the same excellent effects as Examples 1 and 7 but are superior in mechanical strength to Examples 1 and 7.

(Formation of Molded Body and Evaluation of Physical Properties)

In Comparative Example 4, 100 parts by weight of A7 was used.

A7: PMMA resin SUMIPEX EX (Sumitomo Chemical Co., Ltd.) In Comparative Example 5, 100 parts by weight of A1 was used as in the case of Comparative Example 3.

Each of the compositions of Example 3 and Comparative Examples 4 and 5 was kneaded in and extruded from a vent-equipped single screw extruder (HW-40-28 manufactured by TABATA Industrial Machinery Co., Ltd., 40 m/m, L/D=28) at preset temperatures of C1 to C3 of 200° C., a preset temperature of C4 of 210° C., a preset temperature of C5 of 220° C., and a preset temperature of D of 230° C. and pelletized to obtain pellets. The obtained pellets were dried at 90° C. for 3 hours or longer and then subjected to injection molding using an injection molding machine (Model 160MSP-10 manufactured by Mitsubishi Plastics, Inc.) at a cylinder temperature T3 of 235° C., a cylinder temperature T2 of 245° C., a cylinder temperature T1 of 255° C., a nozzle temperature N of 260° C., an injection rate of 19.7%, and a mold temperature of 60° C. to obtain a flat plate sample having a thickness of 2 mm. The total light transmittance and haze of the obtained flat plate sample were measured as indicators of transparency.

Further, ¼-inch test pieces were prepared at the same injection molding temperature to evaluate impact resistance. The results are shown in Table 4.

(Impact Resistance)

Impact resistance was evaluated by an Izod test (temperature: 23° C., humidity: 50%) in accordance with ASTM D-256.

TABLE 4

| | | | Example 3 | Comparative Example 4 | Comparative Example 5 |
|---|---|---|---|---|---|
| Resin (A) | | Type | A1 | A7 | A1 |
| | | (parts) | 53 | 100 | 100 |
| Polymers (B) | | Type | B5 | — | — |
| | | (parts) | 47 | — | — |
| Physical properties of injection-molded body | Film thickness | (mm) | 2 | 2 | 2 |
| | Glass transition temperature | (° C.) | 121 | 108 | 125 |
| | Total light transmittance | (%) | 82.9 | 92.3 | 91.7 |
| | Haze value | (%) | 7.0 | 0.6 | 0.4 |
| Impact resistance | Izod test (¼-inch bar) | kJ/m² | 4.3 | 2.1 | 1.2 |
| Flat plate | photoelastic constant (×10⁻¹²) | (Pa⁻¹) | −0.09 | −3.84 | −4.38 |
| | Orientation birefringence (Crossed Nicols test, Presence or absence of light leakage) | | Absent | Present | Absent |

As can be seen from Table 4, Example 3 has a small photoelastic constant and excellent impact resistance.

Further, in order to compare phase differences (Re) in the obtained flat plate samples, a crossed Nicols test was performed, in which each of the flat plate samples was placed between two polarizing plates orthogonal to each other to determine whether transmitted light was observed (presence or absence of light leakage).

FIGS. 1 to 3 are photographs showing the results of the crossed Nicols test for Example 3 and Comparative Examples 4 and 5, respectively. In general, when a resin is injection-molded, the resin is likely to be oriented particularly in the vicinity of a gate so that light leakage resulting from orientation birefringence is likely to occur (Comparative Example 4, FIG. 2).

On the other hand, as shown in FIG. 1, such light leakage was hardly observed in the case of the flat plate sample made of the acrylic resin composition according to the present invention (Example 3). Also in the case of Comparative Example 5, light leakage resulting from orientation birefringence did not occur, but as can be seen from Table 4, Example 3 is much lower in photoelastic birefringence (constant) than and much superior in impact resistance to Comparative Example 5. That is, the acrylic resin composition according to the present invention is suitable as a material of an injection-molded body such as a lens, a pick-up lens, or a lens array required to have very high optical isotropy.

The invention claimed is:

1. A non-birefringent resin material comprising a resin (A) and a polymer (B) and having an orientation birefringence of $-1.7 \times 10^{-4}$ to $1.7 \times 10^{-4}$ and a photoelastic constant of $-4 \times 10^{-12}$ to $4 \times 10^{-12}$ Pa$^{-1}$, wherein the polymer (B) is a multi-layered polymer containing a (meth)acrylic cross-linked polymer layer and a hard polymer layer containing, as a structural unit, 5 to 70 wt % relative to total monomers in the hard polymer layer of a vinyl-based monomer represented by the following formula:

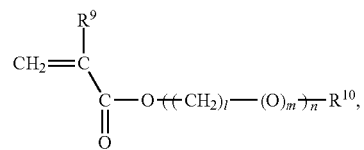

where $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10, and a photoelastic constant of the resin (A) and a photoelastic constant of the polymer (B) are opposite in sign.

2. The non-birefringent resin material according to claim 1, which has a tensile elongation at breakage of 10% or more.

3. The non-birefringent resin material according to claim 1, wherein the resin (A) is an acrylic resin.

4. The non-birefringent resin material according to claim 1, wherein the hard polymer layer having, as a structural unit, the monomer represented by the above formula (4) is obtained by polymerization of 5 to 70 wt % of the monomer represented by the above formula (4), 95 to 30 wt % of another monomer copolymerizable therewith, and 0 to 2.0 parts by weight of a polyfunctional monomer (per 100 parts by weight of a total amount of the monomer represented by the above formula (4) and the another monomer copolymerizable therewith).

5. The non-birefringent resin material according to claim 1, wherein the (meth)acrylic cross-linked polymer layer is obtained by polymerization of 50 to 100 wt % of alkyl acrylate, 50 to 0 wt % of another monomer copolymerizable therewith, and 0.05 to 10 parts by weight of a polyfunctional monomer (per 100 parts by weight of a total amount of the alkyl acrylate and the another monomer copolymerizable therewith).

6. The non-birefringent resin material according to claim 1, wherein in the polymer (B), the hard polymer layer constitutes an outermost layer, and the outermost layer is a hard polymer layer having, as a structural unit, the monomer represented by the above formula (4).

7. The non-birefringent resin material according to claim 6, wherein in the polymer (B), a soft layer having the (meth)acrylic cross-linked polymer layer is adjacent to an inner side of the outermost layer.

8. The non-birefringent resin material according to claim 1, wherein the polymer (B) has a soft inner layer and a hard outer layer, the inner layer has the (meth)acrylic cross-linked polymer layer, and the outer layer has a hard polymer layer having, as a structural unit, the monomer represented by the above formula (4).

9. The non-birefringent resin material according to claim 1, wherein the polymer (B) has a hard inner layer, a soft intermediate layer, and a hard outer layer, the inner layer is composed of at least one hard polymer layer, the intermediate layer has a soft polymer layer composed of the (meth)acrylic cross-linked polymer layer, and the outer layer has a hard polymer layer having, as a structural unit, the monomer represented by the above formula (4).

10. The non-birefringent resin material according to claim 9, wherein the polymer (B) further has a soft innermost layer.

11. The non-birefringent resin material according to claim 1, wherein the monomer represented by the above formula (4) is at least one selected from the group consisting of benzyl (meth)acrylate, dicyclopentanyl (meth)acrylate, and phenoxyethyl (meth)acrylate.

12. The non-birefringent resin material according to claim 1, wherein the polymer (B) has a volume-average particle diameter to the (meth)acrylic cross-linked polymer layer of 20 to 450 nm.

13. The non-birefringent resin material according to claim 1, wherein an amount of the (meth)acrylic cross-linked polymer layer contained in the polymer (B) is 1 to 60 parts by weight per 100 parts by weight of the non-birefringent resin material.

14. The non-birefringent resin material according to claim 1, further comprising birefringent inorganic microparticles.

15. The non-birefringent resin material according to claim 1, further comprising a birefringent low-molecular weight compound.

16. The non-birefringent resin material according to claim 1, wherein the resin (A) is at least one selected from the group consisting of a glutarimide acrylic resin (D) having a unit represented by the formula (1) and a unit represented by the formula (2), a lactone ring-containing acrylic polymer, a partially-hydrogenated styrene-based polymer obtained by partial hydrogenation of aromatic rings of a styrene-based polymer obtained by polymerization of a styrene monomer and another monomer copolymerizable therewith, an acrylic polymer containing a cyclic acid anhydride repeating unit, and a hydroxyl group- and/or carboxyl group-containing acrylic polymer, wherein the formula (1) is represented by

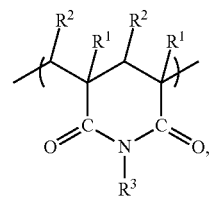

where $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or an aromatic ring-containing substituent group having 5 to 15 carbon atoms; and wherein the formula (2) is represented by

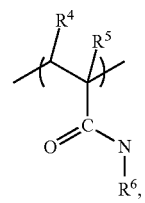

where $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or an aromatic ring-containing substituent group having 5 to 15 carbon atoms.

17. The non-birefringent resin material according to claim 16, wherein the glutarimide acrylic resin (D) does not contain a unit represented by the following general formula (3):

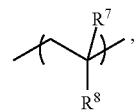

where $R^7$ is hydrogen or an alkyl group having 1 to 8 carbon atoms and $R^8$ is an aryl group having 6 to 10 carbon atoms.

18. A film made of the non-birefringent resin material according to claim 1.

19. The film according to claim 18, which is obtained by melt extrusion.

20. The film according to claim 18, which has an orientation birefringence of $-1.7 \times 10^{-4}$ to $1.7 \times 10^{-4}$ and a photoelastic constant of $-4 \times 10^{-12}$ to $4 \times 10^{-12}$ $Pa^{-1}$.

21. The film according to claim 18, which has a tensile elongation at breakage of 10% or more.

22. The film according to claim 18, which has a thickness of 10 to 500 μm.

23. A molded article made of the non-birefringent resin material according to claim 1.

24. The molded article according to claim 23, wherein the molded article is a lens.

25. The molded article according to claim 23, wherein the molded article is a light guide plate.

26. A non-birefringent resin material comprising a resin (A) and a polymer (B), wherein a photoelastic constant of the resin (A) and a photoelastic constant of the polymer (B) are opposite in sign, and the photoelastic constant of the resin (A) is cancelled out by the photoelastic constant of the polymer (B), wherein the polymer (B) is a multi-layered polymer containing a (meth)acrylic cross-linked polymer layer and a hard polymer layer containing, as a structural unit, 5 to 70% wt % relative to total monomers in the hard polymer layer of a vinyl-based monomer represented by the following formula (4):

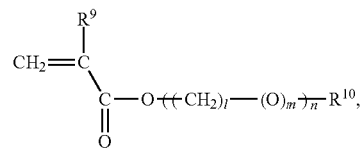

where $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10.

27. The non-birefringent resin material according to claim 26, which has a photoelastic constant of $-4 \times 10^{-12}$ to $4 \times 10^{-12}$ Pa$^{-1}$.

28. The non-birefringent resin material according to claim 26, which has an orientation birefringent of $-1.7 \times 10^{-4}$ to $1.7 \times 10^{-4}$.

* * * * *